United States Patent
Sevindik et al.

(10) Patent No.: US 11,569,931 B2
(45) Date of Patent: Jan. 31, 2023

(54) METHODS AND APPARATUS FOR ENHANCING WIRELESS LINK THROUGHPUT IN SMALL-CELL WIRELESS SYSTEMS

(71) Applicant: Charter Communications Operating, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/086,134

(22) Filed: Oct. 30, 2020

(65) Prior Publication Data

US 2022/0140939 A1    May 5, 2022

(51) Int. Cl.
| | |
|---|---|
| *H04L 1/00* | (2006.01) |
| *H04W 16/16* | (2009.01) |
| *H04W 24/10* | (2009.01) |
| *H04W 24/02* | (2009.01) |

(52) U.S. Cl.
CPC .......... *H04L 1/0018* (2013.01); *H04L 1/0003* (2013.01); *H04L 1/0009* (2013.01); *H04L 1/0016* (2013.01); *H04L 1/0026* (2013.01); *H04W 16/16* (2013.01); *H04W 24/02* (2013.01); *H04W 24/10* (2013.01)

(58) Field of Classification Search
None
See application file for complete search history.

(56) References Cited

U.S. PATENT DOCUMENTS

| | | |
|---|---|---|
| 2006/0285522 A1 | 12/2006 | Kim et al. |
| 2008/0225742 A1 | 9/2008 | Cho et al. |
| 2009/0201861 A1 | 8/2009 | Kotecha |
| 2011/0047287 A1 | 2/2011 | Harrang et al. |

(Continued)

FOREIGN PATENT DOCUMENTS

WO    WO-2021014197 A1    1/2021

OTHER PUBLICATIONS

Deering et al., "Internet Protocol, Version 6 (Ipv6) Specification, IETF RFC 2460," Dec. 1998.

(Continued)

*Primary Examiner* — Adolf Dsouza
(74) *Attorney, Agent, or Firm* — Patent Beach PC

(57) ABSTRACT

Methods and apparatus for enhancing data rates in a small-cell wireless communication network. In one embodiment, the methods and apparatus utilize "quasi-licensed" CBRS (Citizens Broadband Radio Service) wireless spectrum in conjunction with 3GPP wireless communication network (e.g. 4G LTE or 5GNR) for the delivery of services to a number of enhanced fixed wireless apparatus (CPEe/FWAe) at user or subscriber premises. The various CPEe/FWAe report Channel Quality Indicator (CQI) data to their respective serving base stations, and each base station maps the CQI value to a prescribed configuration (e.g., to the Modulation and Coding Scheme (MCS)) adaptively for the transmission of the data to the CPEe/FWAe. In one implementation, the base stations update the CQI to MCS values adaptively according to ACK/NACK requests received from the CPEe/FWAe.

20 Claims, 18 Drawing Sheets

(56) References Cited

U.S. PATENT DOCUMENTS

| | | | |
|---|---|---|---|
| 2016/0323912 A1* | 11/2016 | Nakamura | H04W 72/1284 |
| 2017/0373789 A1 | 12/2017 | Huang et al. | |
| 2018/0248646 A1* | 8/2018 | Wikström | H04L 1/0009 |
| 2018/0352473 A1 | 12/2018 | Gunasekara et al. | |
| 2019/0037418 A1 | 1/2019 | Gunasekara et al. | |
| 2019/0280763 A1* | 9/2019 | Smyth | H04B 7/18517 |
| 2019/0373301 A1 | 12/2019 | Gunasekara et al. | |
| 2020/0169962 A1 | 5/2020 | Fakoorian et al. | |
| 2021/0143885 A1* | 5/2021 | Großmann | H04B 7/0632 |
| 2022/0131747 A1 | 4/2022 | Sevindik et al. | |
| 2022/0141844 A1 | 5/2022 | Sevindik | |

OTHER PUBLICATIONS

Evolved Universal Terrestrial Radio Access (E-UTRA); Physical layer procedures, v16.1.0, dated Apr. 2020.

IEEE Std. 802.11 or related standards including 802.11 a/b/g/n/s/v/ac/ad/ax/ay/ba/be or 802.11-2012/2013, 802.11-2016.

"Internet Protocol, DARPA Internet Program, Protocol Specification", IETF RCF 791, Sep. 1981, 50 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

"Wi-Fi Peer-to-Peer (P2P) Specification", Version 1.5, 2014, Wi-Fi Alliance, 90 pages.

\* cited by examiner

| E-UTRA Operating Band | Uplink (UL) operating band BS receive UE transmit $F_{UL\_low} - F_{UL\_high}$ | | | Downlink (DL) operating band BS transmit UE receive $F_{DL\_low} - F_{DL\_high}$ | | | Duplex Mode |
|---|---|---|---|---|---|---|---|
| 2 | 1850 MHz | – | 1910 MHz | 1930 MHz | – | 1990 MHz | FDD |
| 4 | 1710 MHz | – | 1755 MHz | 2110 MHz | – | 2155 MHz | FDD |
| 5 | 824 MHz | – | 849 MHz | 869 MHz | – | 894 MHz | FDD |
| 7 | 2500 MHz | – | 2570 MHz | 2620 MHz | – | 2690 MHz | FDD |
| 10 | 1710 MHz | – | 1770 MHz | 2110 MHz | – | 2170 MHz | FDD |
| 12 | 699 MHz | – | 716 MHz | 729 MHz | – | 746 MHz | FDD |
| 13 | 777 MHz | – | 787 MHz | 746 MHz | – | 756 MHz | FDD |
| 14 | 788 MHz | – | 798 MHz | 758 MHz | – | 768 MHz | FDD |
| 17 | 704 MHz | – | 716 MHz | 734 MHz | – | 746 MHz | FDD |
| 18 | 815 MHz | – | 830 MHz | 860 MHz | – | 875 MHz | FDD |
| 19 | 830 MHz | – | 845 MHz | 875 MHz | – | 890 MHz | FDD |
| 23 | 2000 MHz | – | 2020 MHz | 2180 MHz | – | 2200 MHz | FDD |
| 25 | 1850 MHz | – | 1915 MHz | 1930 MHz | – | 1995 MHz | FDD |
| 26 b | 814 MHz | – | 849 MHz | 859 MHz | – | 894 MHz | FDD |
| 29 | N/A | | | 717 MHz | – | 728 MHz | FDD |
| 30 | 2305 MHz | – | 2315 MHz | 2350 MHz | – | 2360 MHz | FDD |
| 35 | 1850 MHz | – | 1910 MHz | 1850 MHz | – | 1910 MHz | TDD |
| 36 | 1930 MHz | – | 1990 MHz | 1930 MHz | – | 1990 MHz | TDD |
| 38 | 2570 MHz | – | 2620 MHz | 2570 MHz | – | 2620 MHz | TDD |
| 40 | 2300 MHz | – | 2400 MHz | 2300 MHz | – | 2400 MHz | TDD |
| 41 | 2496 MHz | – | 2690 MHz | 2496 MHz | – | 2690 MHz | TDD |
| 42 | 3400 MHz | – | 3600 MHz | 3400 MHz | – | 3600 MHz | TDD |
| 43 | 3600 MHz | – | 3800 MHz | 3600 MHz | – | 3800 MHz | TDD |
| 46 | 5150 MHz | – | 5925 MHz | 5150 MHz | – | 5925 MHz | TDD |
| 66 | 1710 MHz | – | 1780 MHz | 2110 MHz | – | 2200 MHz | FDD |
| 70 | 1695 MHz | – | 1710 MHz | 1995 MHz | – | 2020 MHz | FDD |

FIG. 5B (Prior art)

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 6 (Prior Art)

METHODS AND APPARATUS FOR ENHANCING WIRELESS LINK THROUGHPUT IN SMALL-CELL WIRELESS SYSTEMS

RELATED APPLICATIONS

This application is generally related to subject matter of co-owned and co-pending U.S. patent application Ser. No. 17/083,144 entitled "METHODS AND APPARATUS FOR ENHANCING SCHEDULER FAIRNESS IN SMALL-CELL WIRELESS SYSTEMS" filed Oct. 28, 2020, and U.S. patent application Ser. No. 17/084,476 entitled "METHODS AND APPARATUS FOR DATA TRAFFIC PRIORITIZATION IN SMALLCELL WIRELESS SYSTEMS" filed Oct. 29, 2020, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for selecting the best channel parameters for e.g., the transmission of data to a user device, such as for example those providing connectivity via technologies such as Citizens Broadband Radio Service (CBRS), LSA (Licensed Shared Access), TVWS, or Dynamic Spectrum Allocation (DSA).

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Similarly, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized unlicensed "small cell" (e.g., 3GPP "femtocell") coverage via a service provider such as a terrestrial fiber or cable MSO. These small cells can leverage e.g., 3GPP unlicensed bands (such as NR-U bands in the 5 GHz range) or other spectrum such as CBRS (3.550-3.70 GHz, 3GPP Band 48), and C-Bands (3.30-5.00 GHz). Technologies for use of other bands such as 6 GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., 3GPP NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs) for their enterprise and residential customers in order to provide wireless coverage and backhaul, whether in high-density urban applications, suburban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

Managed Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users via a variety of different end-user configurations.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, wireless small cells, etc. The nodes 113 convert the optical domain signals to RF signals typically in the range of 42-750 MHz for downstream transmission, and likewise convert RF domain signals to optical for upstream data in the range of 0-42 MHz. Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.

In a typical HFC network headend 102 (see FIG. 1A), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components, including upstream and downstream transceivers, MAC schedulers, QoS functions, security/access authentication, etc. See FIG. 1B, wherein multiple different CBSD/xNB devices 131 serving heterogeneous types of users/clients are backhauled to a common CMTS.

Another key component in the headend 102, is the Edge QAM modulator (EQAM) 105. The EQAM receives e.g., an IP unicast or multicast MPEG transport stream packet over a GigE (Gigabit Ethernet) interface, and produces transport stream on one or more RF channels for transmission over the HFC distribution network 121. The EQAM can also perform other functions such as re-stamp of Program Clock Reference (PCR) timestamps such as for de-jitter processing. Output from the EQAM 105 is combined with video signals (e.g., SDV, analog, etc.) for downstream transmission by the combiner logic 107.

CBRS and Other "Shared Access" Systems—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 202, (ii) Priority Access tier 204, and (iii) General Authorized Access tier 206. See FIG. 2. The three tiers are coordinated through one or more dynamic Spectrum Access Systems (SAS) 302 as shown in FIG. 3 (including e.g., Band 48 therein).

Incumbent Access (existing DOD and satellite) users 202 include authorized federal and grandfathered Fixed Satellite Service (FSS) users currently operating in the 3.5 GHz band shown in FIG. 2. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 204 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 206 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels.

The FCC's three-tiered spectrum sharing architecture of FIG. 2 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 131 (see FIG. 3) can only operate under authority of a centralized Spectrum Access System (SAS) 302. Rules are optimized for small-cell use, but also accommodate point-to-point and point-to-multipoint, especially in rural areas.

Under the FCC system, the standard SAS 302 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 3, these functions are provided for by, inter alia, an incumbent detection (i.e., environmental sensing) function 307 configured to detect use by incumbents, and an incumbent information function 309 configured to inform the incumbent when use by another user occurs. An FCC database 311 is also provided, such as for PAL license validation, CBSD registration, and other functions.

An optional Domain Proxy (DP) 308 is also provided for in the FCC architecture. Each DP 308 includes: (1) SAS interface GW including security; (2) directive translation between CBSD 131 and domain commands; (3) bulk CBSD directive processing; and (4) interference contribution reporting to the SAS.

A domain is defined is any collection of CBSDs 131 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 308 can aggregate control information flows to other SAS, such as e.g., a Commercial SAS (CSAS, not shown), and generate performance reports, channel requests, heartbeats, etc.

CBSDs 131 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

FIG. 4 illustrates a typical prior art CBRS-based CPE (consumer premises equipment)/FWA architecture 400 for a served premises (e.g., user residence), wherein the CPE/FWA 403 is backhauled by a base station (e.g., eNB or gNB) 131, the latter which is backhauled by the DOCSIS network shown in FIG. 1A. A PoE (Power over Ethernet) injector system 404 is used to power the CPE/FWA 403 as well as provide Ethernet (packet connectivity for the CPE/FWA radio head to the home router 405).

Additionally, new wireless systems and small cells are being fielded, including in new frequency bands which may be licensed, unlicensed, or allocated under a shared model similar to that used for CBRS (see e.g., FIG. 5A, illustrating new Band 71 with the 600 MHz region, and FIG. 5B showing e.g., Bands 12-17 in the 700 MHz region).

Unaddressed Issues of Channel Capacity—

Extant wireless architectures, while useful from many standpoints, currently lack mechanisms for selecting the best Modulation and Coding Schemes (MCS) for the transmission of data from a base station (e.g., gNB/CBSD) to a given Consumer Premises Equipment (CPE), such as a premises Fixed Wireless Access (FWA), adaptively according to channel condition. For example, in existing CBRS technology (e.g., based on 3GPP technology), depending on the report from the CPE, the network transmits data to the FWA with different transport block sizes and with different MCS values. In particular, in some cases, the network may transmit a large transport block size with high MCS, and the FWA may fail to decode it. In some other cases, the network may transmit a small block size with low MCS value, while the FWA is capable of decoding a larger block size with higher MCS. Hence, the transmissions in these cases are not optimized.

In 3GPP technology, the Channel Quality Indicator (CQI), as defined in 3GPP TS 36.213, entitled "Evolved Universal Terrestrial Radio Access (E-UTRA); Physical layer procedures", v16.1.0, dated April 2020, which is incorporated herein by reference in its entirety, indicates Downlink (DL) RF channel quality measured by a UE. The CQI value ranges from 0-15, as specified in 3GPP TS 36.213 (See FIG. 6 herein, derived from TS 36.213 Table 7.3.2-1).

In a cellular wireless system (e.g., 4G LTE/5G), the RF channel between a given base station and UE varies in a very short period due to UE mobility, and MCS needs to be changed rapidly in some cases according to the channel variations. The UE measures Reference Signal Received Power (RSRP), maps the RSRP to Signal-to-Interference-Noise-Ratio (SINR) with a predefined formula, calculates CQI value from a lookup table that shows the relation between SINR and CQI, and reports the calculated CQI to the base station. Consequently, the base station maps the received CQI value to an MCS from a pre-defined lookup table (e.g., FIG. 6) specified in TS 36.213, and adjust its DL MCS according to the mapped value from the table.

In a prior art FWA system, as shown in the architecture 400 of FIG. 4, the CPE 403 is located at a fixed location, and hence the RF channel characteristics between CBSD and CPE does not vary significantly in short duration, which causes the FWA RF channel to be static. Since the FWA channel is static, the CPE may report the same CQI in different time slots to the base station, even if the CPE is not able to decode the transmitted data from the base station, or alternatively when it can support a higher MCS value.

As described, existing CQI mapping mechanisms only consider fast RF channel variations in a short time to adjust MCS in order to maximize achievable throughput according to channel conditions. In some scenarios the channel may vary slowly, however the CPE may not be able to decode the transmitted data block or not operating in its maximum throughput capacity, and therefore the existing CQI mapping mechanisms can fail to perform adequately in these environments. As a result, the UE may experience reduced throughput and performance.

Hence, to enhance throughput for systems such as those utilizing CBRS spectrum, improved apparatus and methods are needed to adaptively update channel quality data such as e.g., CQI according to channel variations, including in fixed installations such as FWA where channel quality variations may be much slower and smaller in magnitude. Such improved apparatus and methods would ideally provide high level of performance (e.g., data rates on the DL) for CPE/FWA for at least static environment without large capital expenditures (CAPEX) to install e.g., additional hardware.

SUMMARY

The present disclosure addresses the foregoing needs by providing, inter alia, methods and apparatus for optimizing operation (e.g., enhancing data rates) for, inter alia, served CPE such as FWA devices within a wireless network.

In a first aspect of the disclosure, a method of operating a base station within a wireless network is described. In one embodiment, the method includes: obtaining data related to channel quality from an end-user device; mapping the obtained channel quality data to an index relating to a transmission configuration of a radio transmitter of the base station; transmitting data to the end-user device using the radio transmitter configured according to the index; and receiving feedback data from the end-user device relating to the sufficiency of the data transmission.

In one variant, the method further includes utilizing the received feedback data to select a subsequent value of the index for transmission of subsequent data via the radio transmitter. In one implementation thereof, the utilizing the received feedback data to select a subsequent value of the index for transmission of subsequent data via the radio transmitter includes: determining that the sufficiency of the data transmission does not meet at least one prescribed criterion; and based at least on the determining, reconfiguring the radio transmitter to operate according to a configuration supporting a lower data rate modulation and coding scheme.

In another implementation, the utilizing the received feedback data to select a subsequent value of the index for transmission of subsequent data via the radio transmitter includes: calculating a new CQI-to-MCS (Channel Quality Index to Modulation and Coding Scheme) correlation relationship; and updating a CQI-to-MCS data structure based on the calculated relationship.

In another variant of the method, the base station includes a CBRS (Citizens Broadband Radio Service) CBSD (Citizens Broadband Service Device) compliant with 3GPP (Third Generation Partnership Project) protocols; the transmitting the data includes transmitting using a CBRS frequency within the band of 3.550 to 3.700 GHz inclusive, the CBRS frequency assigned to the CBSD by a SAS (Spectrum Allocation System); and the user device includes a CBRS fixed wireless apparatus (FWA).

In a further variant, the receiving feedback data from the end-user device relating to the sufficiency of the data transmission includes receiving data relating to a need for retransmission of the data due to a decoding failure by the end-user device.

In another aspect of the disclosure, a fixed wireless apparatus for use in a wireless network is described. In one embodiment, the apparatus includes: at least one wireless interface; processor apparatus in data communication with the at least one wireless interface; and storage apparatus in data communication with the processor apparatus, the storage apparatus comprising at least one computer program configured to, when executed by the processor apparatus: utilize the at least one wireless interface to measure at least one aspect of a radio frequency (RF) signal transmitted from a base station serving the fixed wireless apparatus; based at least on the measured at least one aspect, determine at least one data value indicative of a quality of a channel carrying the transmitted RF signal; transmit the at least one data value to the base station using the at least one wireless interface; and thereafter: perform decoding operations on user plane (UP) data transmitted to the fixed wireless apparatus using the channel based at least on parameters obtained by the base station using the at least one data value; and based at least on the decoding operations, transmit feedback data to the base station using the at least one wireless interface.

In one variant, the base station includes a CBRS (Citizens Broadband Radio Service) CBSD (Citizens Broadband Service Device) compliant with 3GPP (Third Generation Partnership Project) protocols; the UP data is received using a CBRS frequency within the band of 3.550 to 3.700 GHz inclusive, the CBRS frequency assigned to the CBSD by a SAS (Spectrum Allocation System); and the fixed wireless apparatus includes a CBRS fixed wireless apparatus (FWA) disposed at a user premises. In one implementation, the base station and fixed wireless apparatus are each managed by a common network operator serving the user premises.

In another variant: the measured at least one aspect of a radio frequency (RF) signal includes a received power measurement; and the determination of the at least one data value indicative of a quality of a channel carrying the transmitted RF signal includes: determination of a quantity relating signal to noise within the RF signal; and using the determined quantity to generate at least one channel quality index value.

In a further variant, the at least one computer program is further configured to, when executed by the processor apparatus, determine that the channel carrying the transmitted RF signal is substantially invariate over a prescribed period of time.

In another aspect of the disclosure, computer readable apparatus is described. In one embodiment, the apparatus includes a storage medium, the storage medium comprising at least one computer program, the at least one computer program comprising a plurality of instructions which are configured to, when executed on a processing device, cause iterative update of at least one aspect of a configuration of a radio frequency transmitter to optimize a data rate during transmission of data by at least: receipt of channel quality data associated with a wireless physical channel; association of the received channel quality data with a particular fixed wireless apparatus that transmitted the channel quality data; correlation of the channel quality data to an index indicating at least one aspect of a configuration of a radio frequency transmitter for use during said transmission of data; configuration of the radio frequency transmitter based at least on the index; causing transmission of data from the radio frequency transmitter to the particular fixed wireless apparatus after said configuration over the wireless physical channel; receipt of performance data indicative of the capacity of the wireless physical channel; and iterative modification of the at least one aspect of a configuration of a radio frequency transmitter for use during respective subsequent transmission of data in order to converge on an optimized data rate.

In one variant, the receipt of channel quality data associated with a wireless physical channel includes receipt of a plurality of CQI (channel quality index) data corresponding to respective ones of different times; and the at least one computer program is further configured to, when executed on the processing device, determine that a channel to be used for carrying the transmitted data is sufficiently invariate.

In another variant, the processing device includes a processing device of a wireless base station; and the association of the received channel quality data with a particular fixed wireless apparatus that transmitted the channel quality data includes utilizing identifier data unique to the fixed wireless apparatus in order to uniquely identify the particular fixed wireless apparatus and channel quality data associated therewith within a data structure maintained by the wireless base station, the data structure also comprising channel quality data uniquely associated with other fixed wireless apparatus.

In a further variant, the receipt of performance data indicative of the capacity of the wireless physical channel includes receipt of a plurality of data over a prescribed period of time, individual ones of the plurality of data associated with individual transmissions of data to the fixed wireless apparatus occurring at different times.

In one implementation thereof, the receipt of the plurality of data over a prescribed period of time includes receipt of data indicative of whether the channel capacity was exceeded.

In another aspect of the disclosure, a method of operating a fixed wireless access (FWA) or mobile device within a wireless network is described. In one embodiment, the method includes: measuring a station power via a DL reference signal, computing the Signal-to-Interference-Plus-Noise (SINR) ratio, mapping the SINR to Channel Quality Indicator (CQI) via a lookup table or mathematical equation, and transmitting the CQI value to the base station.

In one variant, the mapping the SINR to CQI includes computing an effective SINR from the calculated SINRs across time and frequency resources in one or more DL data blocks. In one embodiment, the effective SINR is computed such that to maximize the mutual information transfer between the base station and the FWA.

In another aspect of disclosure, a method of operating a base station within a wireless network is disclosed. In one embodiment, the method includes: receiving CQI value from a CPE, mapping the CQI value to a Modulation and Coding Scheme (MCS) value through a pre-defined lookup table, transmitting the data to the CPE using the MCS mapped from CQI; receiving the feedback from the CPE indicating if the CPE can decode all the transmitted data; updating the CQI-to-MCS mapping values stored in the pre-defined lookup table according to the received feedback from the CPE; and transmitting the data to the CPE using the updated CQI-to-MCS mapping lookup table.

In one variant, receiving feedback from the CPE includes ACK/NACK feedback indicating whether the CPE retransmit the whole data block or not. If the CPE transmits an ACK signal, the base station may increase the MCS value for the DL transmission of the data block. Also, if the CPE receives a NACK signal, the base station may decrease MCS value.

In a further variant of the method, the CPE is configured to operate within a frequency range between 3.550 and 3.70 GHz inclusive, and establishment of a wireless connection to wireless network requires causing a request to be issued to a SAS (spectrum allocation system) in data communication with the wireless network to obtain at least one spectrum grant, at least one frequency within the at least one spectrum grant being utilized to establish the wireless connection. In one such implementation, the method further includes: receiving at the CPE data relating to the at least one spectrum grant from a base station within the wireless network, and utilizing the received data relating to the at least one spectrum grant in the establishment of the wireless connection.

In another aspect of the disclosure, computerized premises apparatus for use in a wireless network is disclosed. In one embodiment, the apparatus includes: at least one wireless interface; processor apparatus in data communication with the at least one wireless interface; and storage apparatus in data communication with the processor apparatus, the storage apparatus comprising at least one computer program.

In one variant, the at least one computer program is configured to, when executed by the processor apparatus: utilize the at least one wireless interface to obtain data relating to maximum data rate an end-user device in communication with the computerized premises apparatus can support; transmit a data block to the end-user device at the maximum data rate indicated by the end-user; obtain the data from the end-user device relating to if the end-user decoded all the transmitted data successfully; adjusting the data rate and block size according to the obtained data from the end-user based on if the end-user decoded all the data successfully or not.

In one implementation, the computerized premises apparatus includes an FWA (fixed wireless access) device configured to operate in a CBRS (citizens broadband radio service) frequency band, and the at least one base station includes a 3GPP-compliant gNodeB (gNB) configured to operate in the same CBRS frequency band as a CBRS CBSD.

In another implementation the data relating to the maximum data rates includes data relating to the maximum MCS value the end-user device can decode successfully.

In another implementation, the at least one computer program is further configured to, when executed by the processor apparatus: utilize the obtained data from the end-user to determine that if the wireless channel between the base station and the end-user can support transmission of data at a higher MCS value; increase the MCS value for the transmission of the data to the end-user if the obtained data indicates that the wireless channel can support the higher MCS value.

In another embodiment, the utilization of the obtained data to determine if the wireless channel can support a higher value is performed dynamically and adaptively according to the wireless propagation environment variations.

In another embodiment, the computerized apparatus includes at least one computer program configured to, when executed by the processor apparatus: retrieve the data from a database stored in the storage device to map the obtained data related to maximum data rate the end-user device can support to the MCS value and the associated data block size.

In another embodiment, the computerized premises apparatus includes at least one computer program configured to, when executed by the processor apparatus: utilize the at least one wireless interface to receive data relating from the retransmission request from the user-end device; determine the MCS value and the data block size for the transmission of the data to the end-user based on the existence of the retransmission request form the end-user device; and store the determined MCS values and data block size in the database.

In one such implementation, the computerized premises apparatus includes an FWA device configured to operate in a CBRS (citizens broadband radio service) frequency band, and the base station includes a 3GPP-compliant gNodeB (gNB) configured to operate in the same CBRS frequency band.

In another aspect of the disclosure, a method of operating a wireless network infrastructure is disclosed. In one embodiment, the method includes using one or more enhanced base station with adaptive CQI functionality as described herein.

In yet another aspect of the disclosure, a method of dynamically updating CQI-to-MCS mapping rule according to the end-user decoding capacity, is disclosed. In one embodiment, the method includes using ACK/NCK requests as part of determining the end-user decoding capability.

In an additional aspect of the disclosure, computer readable apparatus is described. In one embodiment, the apparatus includes a storage medium configured to store one or more computer programs, such as on a fixed wireless receiver of a managed wireless network. In one embodiment, the apparatus includes a program memory or HDD or SSD and stores one or more computer programs supporting channel quality assessment and channel RF parameter adjustment associated with one or more other fixed wireless receivers.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In yet a further aspect, a network architecture configured to enable common control and/or sharing of data relating to FWA channel quality between two or more base stations within the architecture is disclosed.

These and other aspects shall become apparent when considered in light of the disclosure provided herein.

BRIEF DESCRIPTION OF THE DRAWINGS

FIG. 5B is a tabular representation of various E-UTRA RF spectrum bands currently allocated.

FIG. 6 is a tabular representation of exemplary prior art CQI value ranges from 0-15, as specified in 3GPP TS 36.213, Table 7.3.2-1.

FIGS. 1-5B and 7-14 ©Copyright 2019-2020 Charter Communications Operating, LLC. All rights reserved.

DETAILED DESCRIPTION

Figure 1:
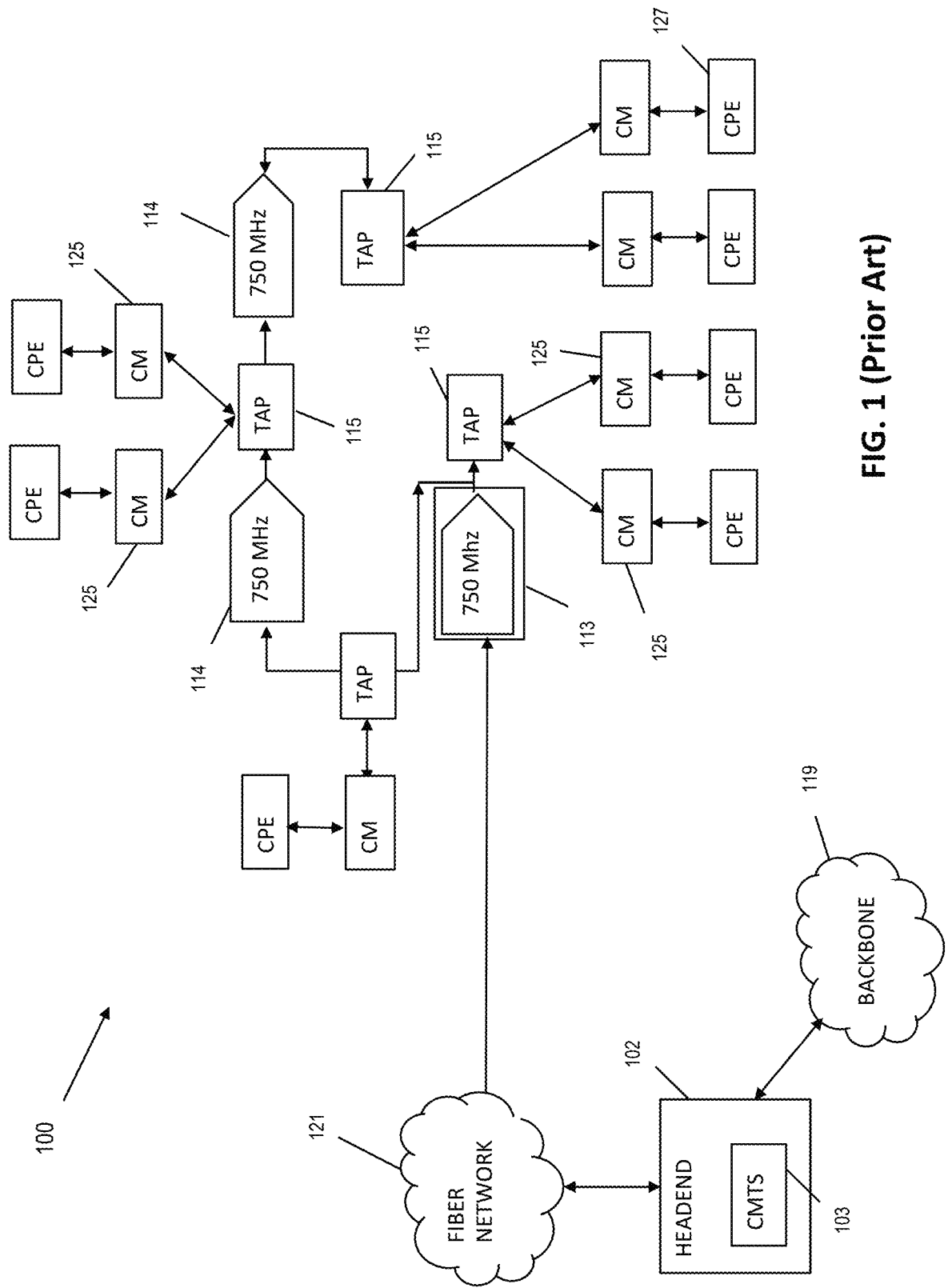
FIG. 1 is a block diagram illustrating a prior art hybrid fiber-coaxial (HFC) data network for delivery of data to end user devices.
Figure 1A:
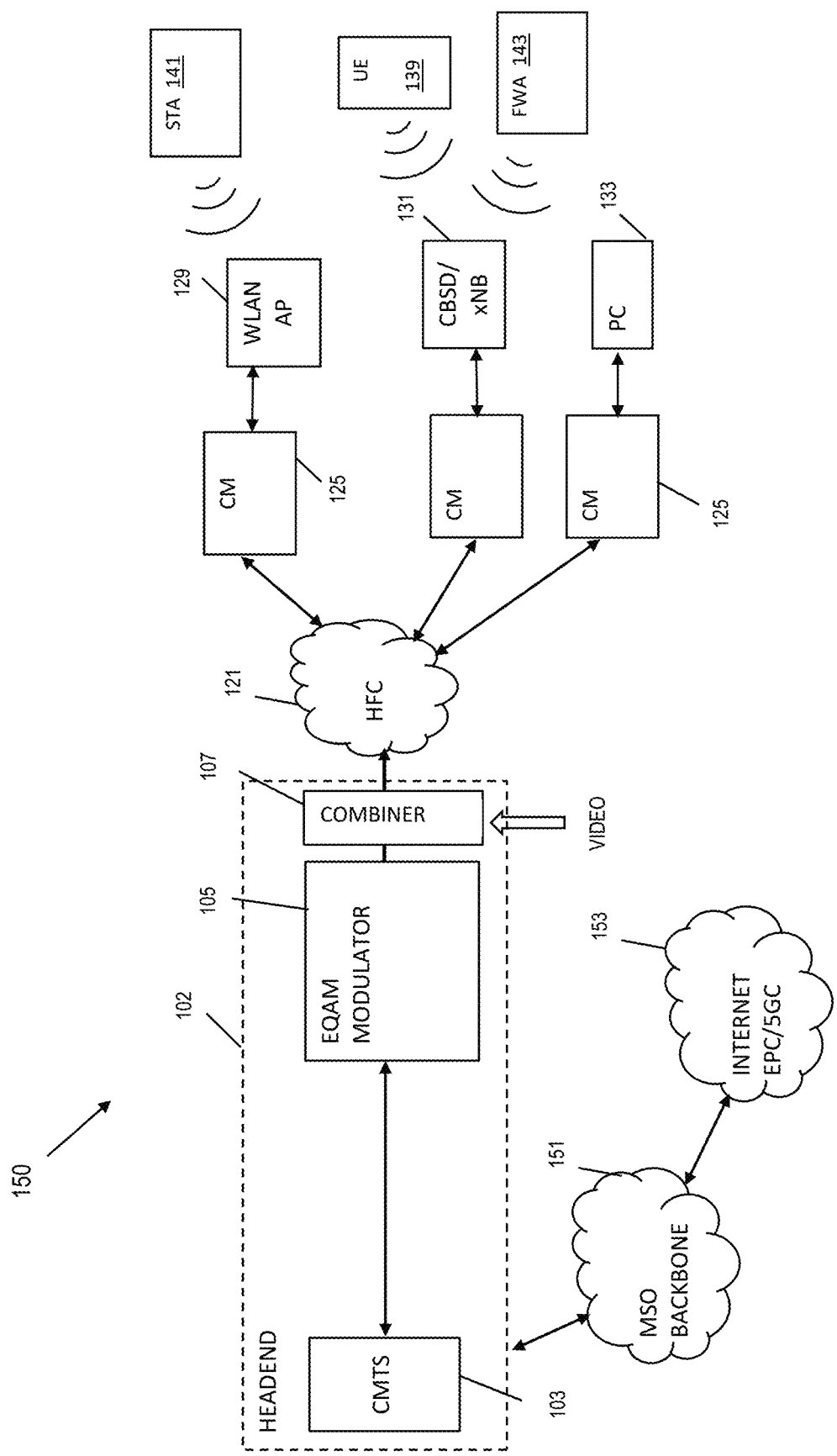
FIG. 1A is a block diagram illustrating the DOCSIS infrastructure of the HFC network of FIG. 1, and various types of backhauled premises devices.
Figure 1B:
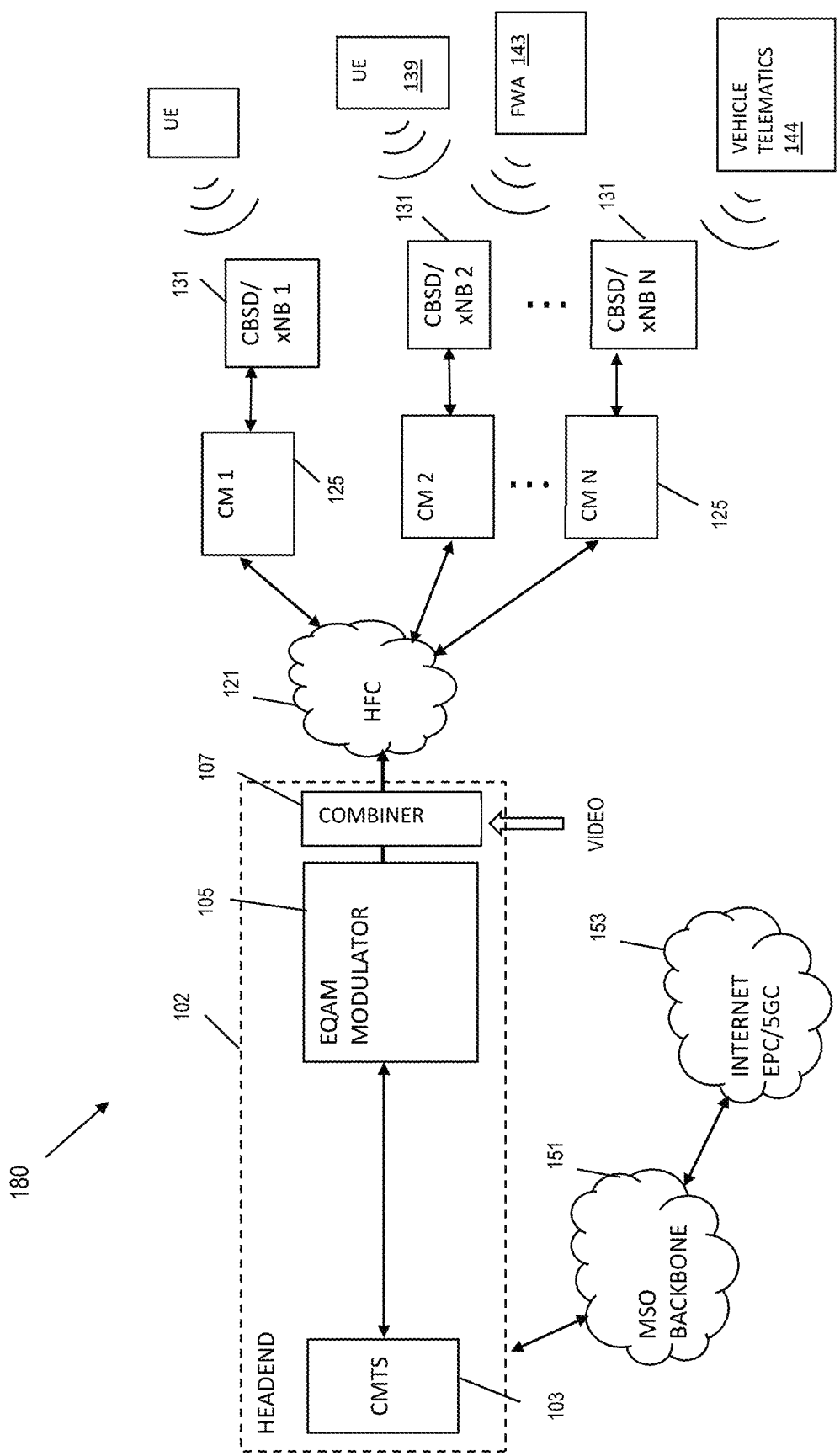
FIG. 1B is a block diagram illustrating the DOCSIS infrastructure of the HFC network of FIG. 1, wherein multiple different CBSD/xNB devices serving heterogeneous types of users/clients are backhauled to a common CMTS.
Figure 2:
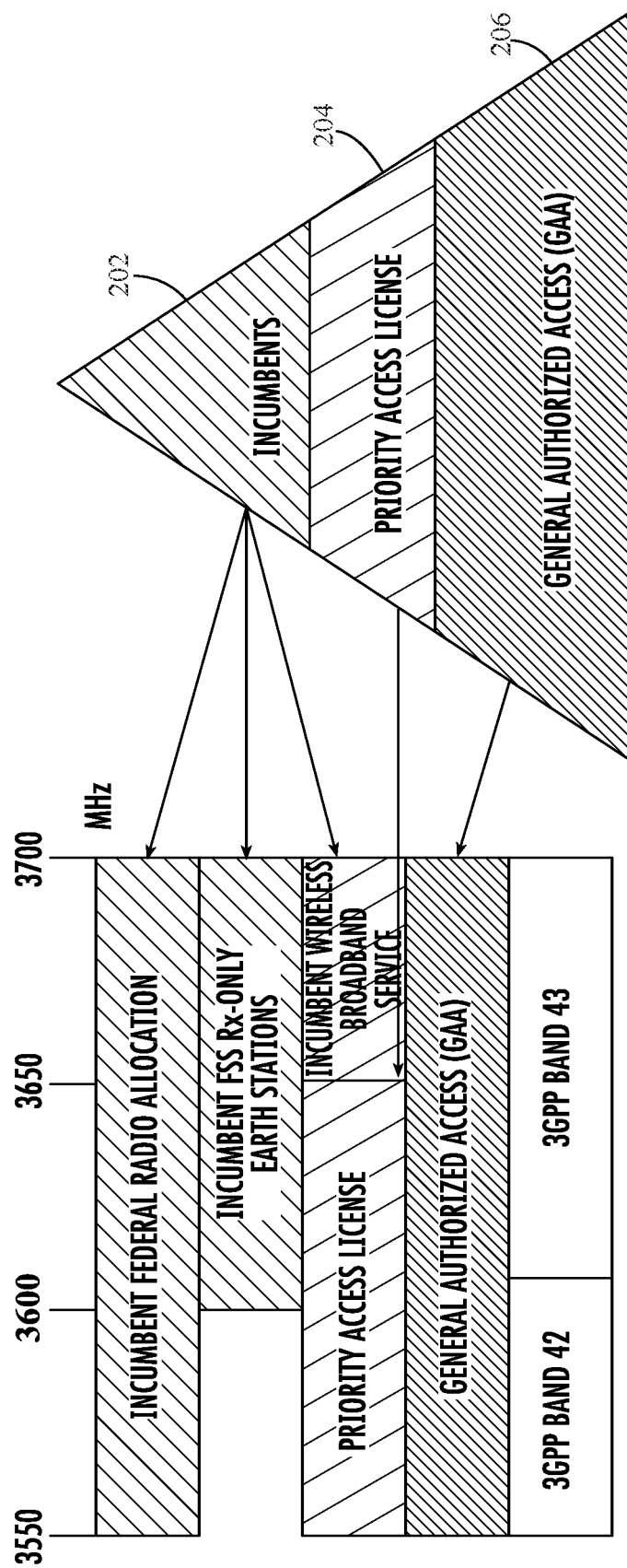
FIG. 2 is a graphical illustration of prior art CBRS (Citizens Broadband Radio Service) users and their relationship to allocated frequency spectrum in the 3.550 to 3.700 GHz band.

Reference is now made to the drawings wherein like numerals refer to like parts throughout.

As used herein, the term "access node" refers generally and without limitation to a network node which enables communication between a user or client device and another entity within a network, such as for example a CBRS CBSD, small cell, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment. Applications as used herein may also include so-called "containerized" applications and their execution and management environments such as VMs (virtual machines) and Docker and Kubernetes.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, Jan. 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto, as well as so-called "Extended Spectrum DOCSIS".

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with any of 3GPP Release 15-17, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS, and other bands such as e.g., Bands 12-17 and 71.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/

3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "wireline" includes electrical and optical transmission media such as, without limitation, coaxial cable, CAT-5/6 cable, and optical fiber.

As used herein, the term "xNB" refers to any 3GPP-compliant node including without limitation eNBs (eUTRAN) and gNBs (5G NR).

Overview

In one exemplary aspect, the present disclosure provides methods and apparatus for enhancing data rates to served user devices (e.g., enhanced fixed wireless consumer premises equipment or CPE) by selecting the optimal configuration parameters (e.g., Modulation and Coding Scheme (MSC)) for downlink data transmission, and periodically updating the selection if needed based on feedback received from the CPE.

In one embodiment, the enhanced CPE all utilize CBRS "quasi-licensed" spectrum via 3GPP-based infrastructure and protocols within a managed content distribution network. The enhanced CPE each measure their respective RF channel, calculate one or more CQI values, and send the CQI value(s) to their serving base station (e.g., CBSD). Once the base station receives the CQI value data, it selects the proper DL channel parameters such as MCS according to the reported CQI value(s) for each CPE, for the transmission of user data to that CPE. The base station may increase or decrease the MCS level adaptively according to the CPE decoding capability, which is reported to the base station via feedback, such that the CPE operates in its maximum throughput.

In one implementation, the base station monitors the data retransmission requests from each CPE, as the feedback. If a CPE cannot decode the data packets transmitted on the DL successfully, the CPE will request the base station retransmit the data. If there is no transmission request, additional channel capacity can be presumed, and a higher MCS can be used in the RF channel for data transmission that the CPE is able to decode. In this case, the base station updates its local CQI data structure with new values, and uses these values for subsequent transmissions of data to the CPE so as to increase DL data throughput to the CPE, without the need to use excessive power at the base station.

In addition, selecting the best possible MCS according to the CPE decoding or throughput capability (in order to maximize channel capacity) increases the network capacity without the need to install additional infrastructure such as CBSDs and associated backhaul, thereby effectively adding more customers to the network with a given CAPEX (capital expenditure). Comparatively lower radiated power by the CBSD also advantageously reduces cross-CBSD and other interference within the served environment/region.

The methods and apparatus described herein may also advantageously be extended to other licensed, non-licensed, or shared-access architectures (i.e., other than CBRS) such as for example DSA, LSA, and TVWS systems.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned base station (e.g., 3GPP eNB or gNB), wireless premises devices using unlicensed or quasi-licensed spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or audio or voice). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols.

Moreover, while some embodiments herein are described in terms of CBRS spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitation DSA, LSA, or TVWS systems, and those above 4.0 GHz (e.g., currently proposed allocations up to 4.2 GHz, and even millimeter wave bands such as those between 24 and 100 GHz), whether licensed, quasi-licensed or unlicensed.

Additionally, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects are generally access technology "agnostic" and hence may be used across different access technologies, and can be applied to, inter alia, any type of P2MP (point-to-multipoint) or MP2P (multipoint-to-point) technology, including e.g., Qualcomm Multefire.

Other features and advantages of the present disclosure will immediately be recognized by persons of ordinary skill in the art with reference to the attached drawings and detailed description of exemplary embodiments as given below.

Exemplary Network Architecture—

Figure 7:
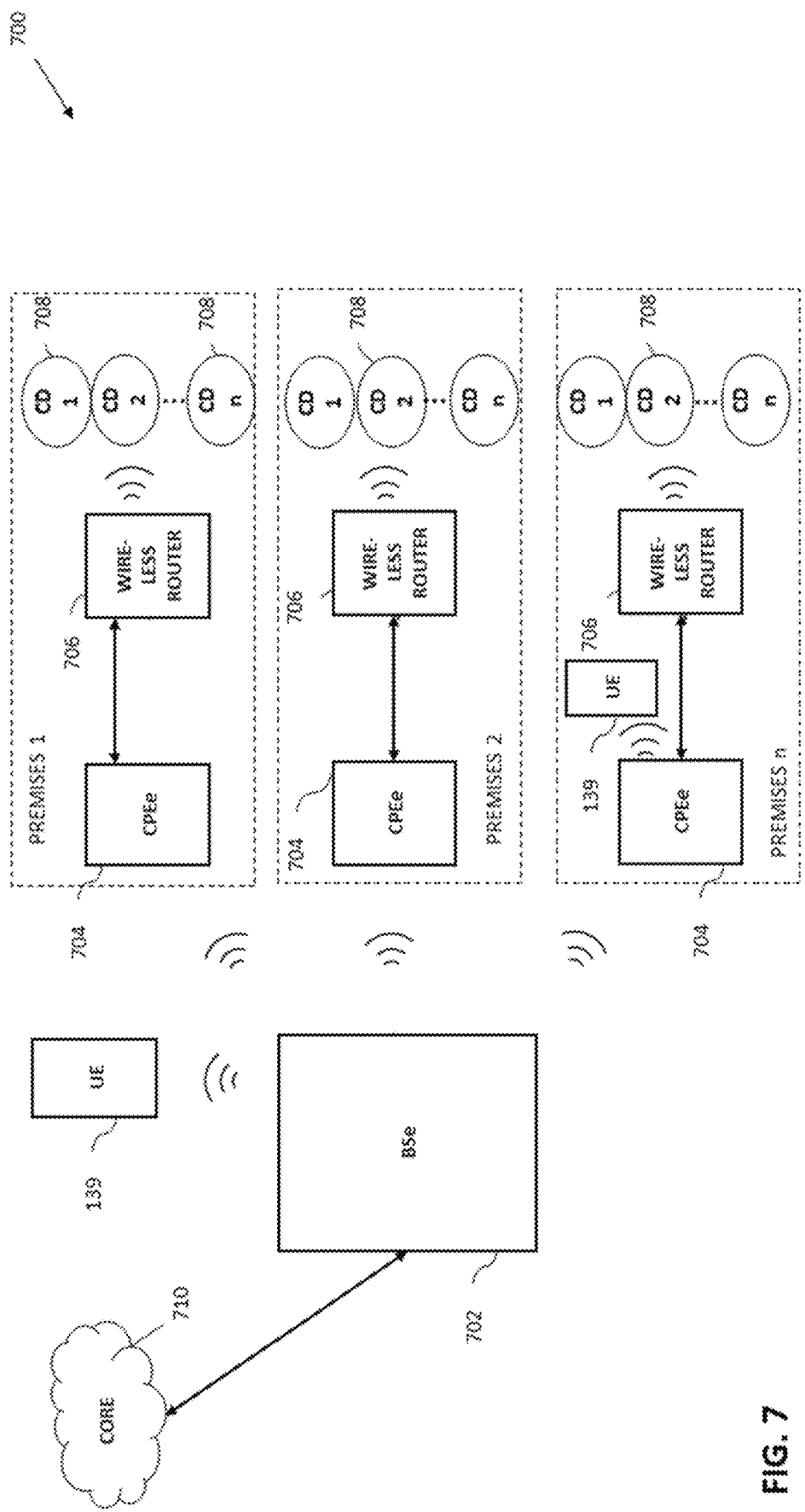
FIG. 7 is a block diagram illustrating one exemplary wireless delivery architecture according to the present disclosure, including enhanced base station (BSe) and enhanced CPE (CPEe).

FIG. 7 is a block diagram illustrating a general network architecture configured for data traffic prioritization and management according to the present disclosure.

As illustrated, the exemplary network architecture 700 includes at least one enhanced base station or BSe 702 (e.g., CBSDe/xNBe) connected to a core network 710, a plurality of CPEe 704 (e.g., FWAe devices), a plurality of respective wireless routers 706, and one or more client devices 708 connected to each wireless router 706. The CPEe may also support (backhaul) other devices such as DSTBs, modems, local small cells or access nodes, and IoT devices, not shown.

Figure 5A:
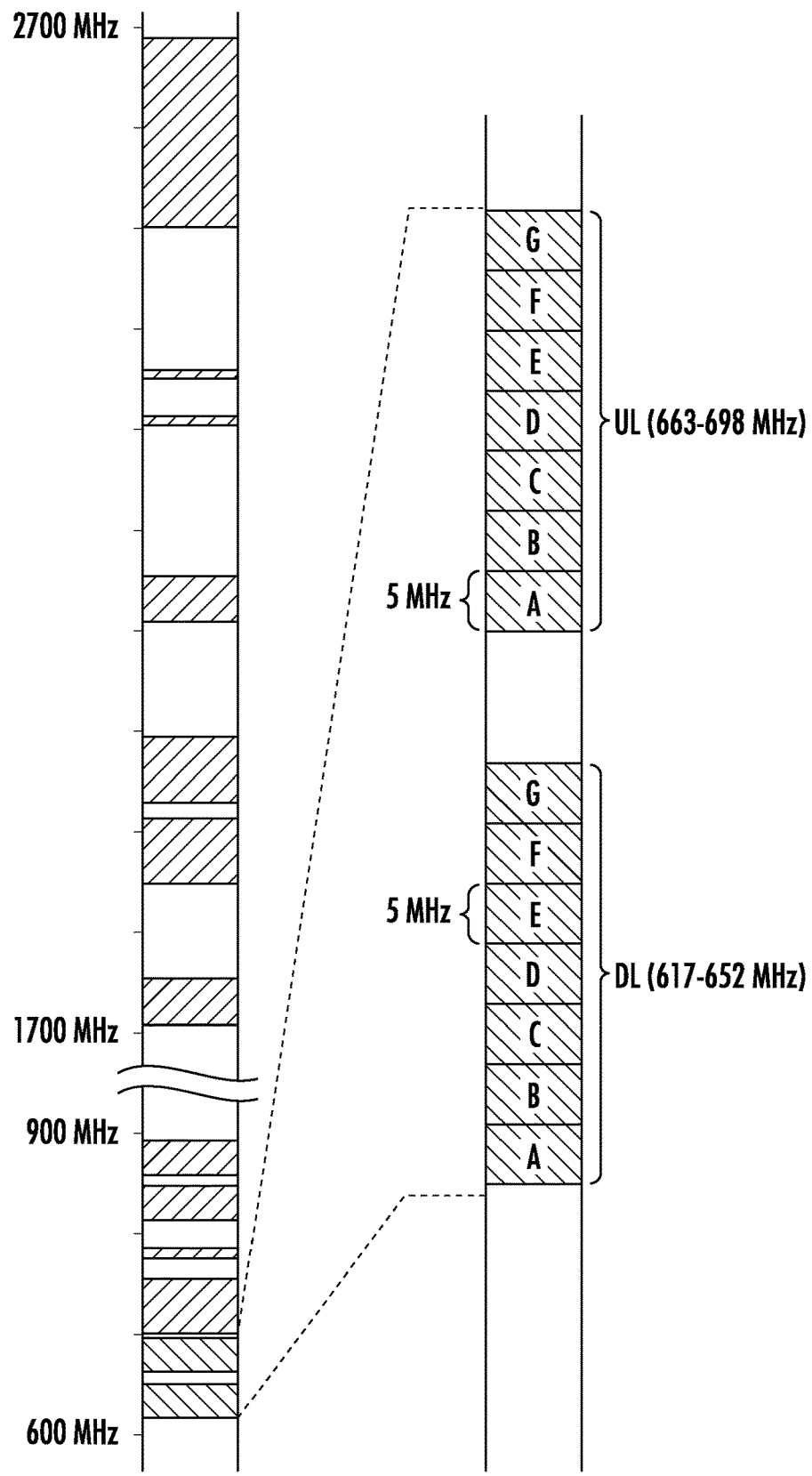
FIG. 5A is a graphical representation of Band 71 radio frequency (RF) spectrum currently allocated for use by the FCC.

In one exemplary embodiment, the BSe 702 is connected wirelessly to each CPEe 704. For example, a radio access technology such as 3GPP 4G-LTE or 5G-NR can be used, in conjunction with the CBRS technology discussed elsewhere herein, to establish the wireless connection between the base station 702 and the CPEe 704. Moreover, as referenced herein, different spectrum (and types of spectrum) can be used consistent with the architecture 700, including e.g., ultra-high bandwidth mmWave as set forth in recent 3GPP 5G NR standards, and/or licensed sub-1 GHz spectrum (see FIGS. 5A and 5B), with CBRS spectrum being merely exemplary.

As illustrated, the BSe 702 may also serve mobile UE 139, or other devices not shown directly (versus service at a served premises by the CPEe or associated small cell, as shown in the diagram of Premises N in FIG. 7).

Figure 9:
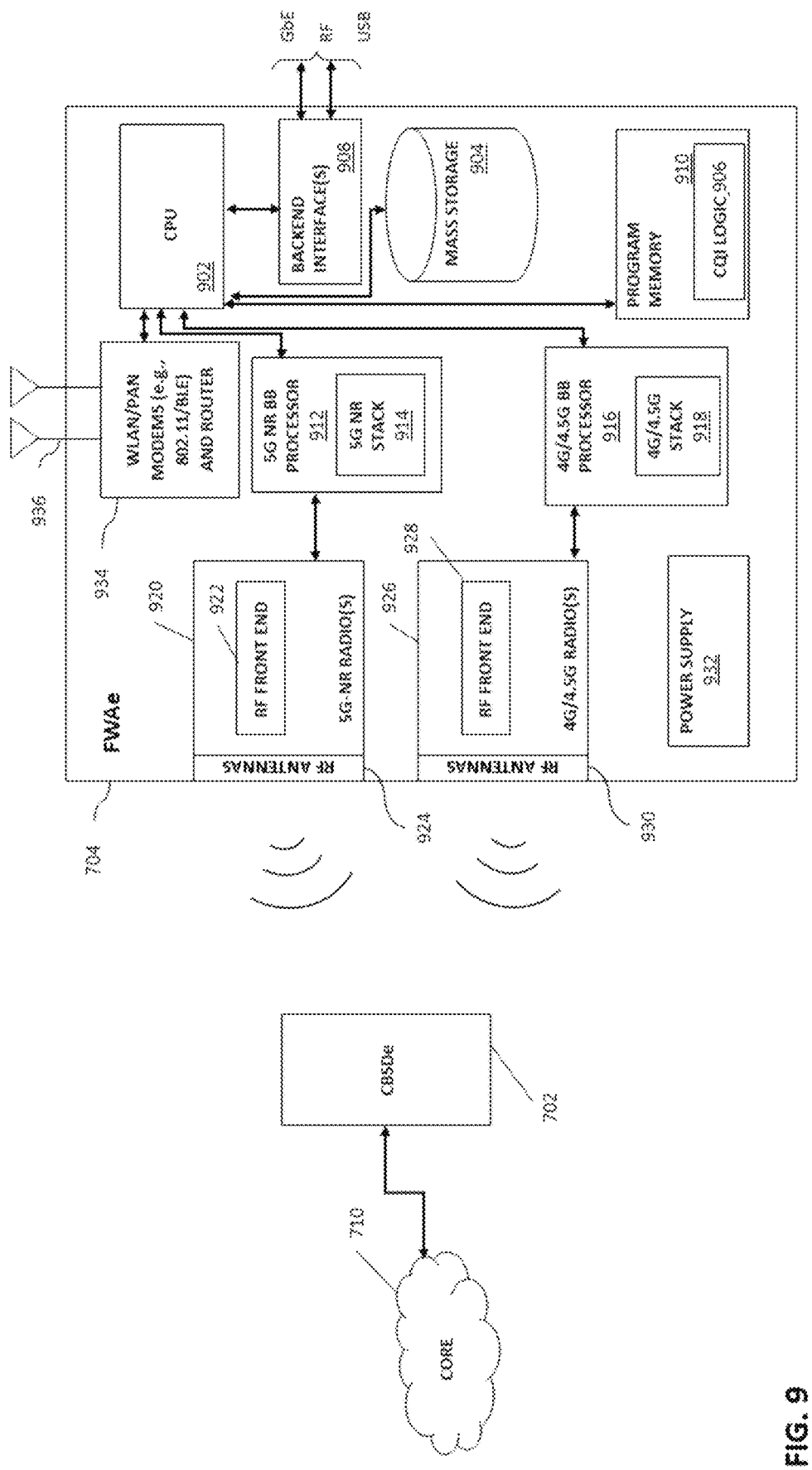
FIG. 9 is a block diagram illustrating an exemplary embodiment of an FWAe apparatus according to the present disclosure.

Each CPEe 704 is connected in the illustrated embodiment via cable such as a CAT-5 cable to a wireless router 706 to provide a local area network (WLAN) service for the connected devices 708. It may also be integrated within e.g., the CPEe 704 as shown in the embodiment of FIG. 9, discussed infra. A connected device 708 can be any device that can connect to the wireless router 706 (e.g., via Wi-Fi connection), to consume any type of data that can be transmitted through it. Examples of the connected devices 708 include but are not limited to a smartphone, tablet, a personal computer (including a laptop), a smart television, or USB-based "stick" appliance. As discussed elsewhere herein, the connected devices 708 can consume various different types of data traffic generated for, e.g., web browsing, VoIP calling, video streaming, etc., including simultaneously based on different applications operative on the client.

In one embodiment, the network components of the architecture 700 are managed by a common network operator (e.g., cable MSO), with the core network 710 comprising a 3GPP EPC or 5GC serving core functions for a plurality of BSe 702 distributed throughout an operating area. The individual served premises may be within urban, suburban, or rural areas in varying densities, such as within an MDU (e.g., apartment building), enterprise campus, or distributed throughout broader areas.

Moreover, while one CPEe 704 is shown serving each premises, the various premises can be aggregated or "ganged" together such that one CPEe serves multiple premises users, such as where a single CPEe serves an apartment building or college dorm, with each individual user account having its own wireless router 706 and other premises client devices with all being backhauled by a single CPEe. This may be the case in e.g., mmWave based installations which have extremely high bandwidth and backhaul capability.

Enhanced Base Station (BSe)—

Figure 8:
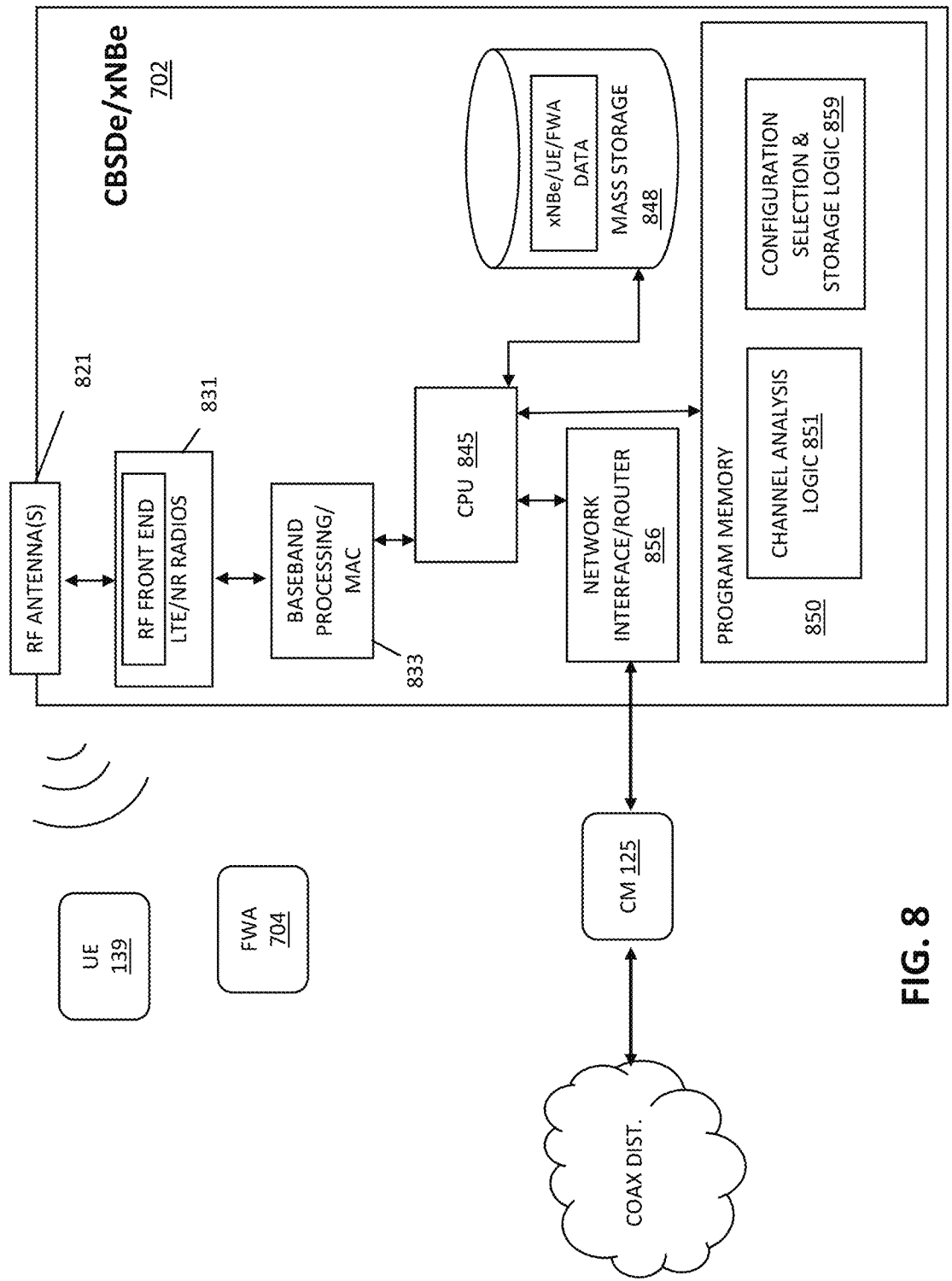
FIG. 8 is a block diagram illustrating an exemplary embodiment of a CBSDe/xNBe base station apparatus according to the present disclosure.

FIG. 8 is a block diagram illustrating one exemplary embodiment of enhanced base station (BSe) apparatus configured for provision of enhanced data traffic prioritization and scheduling functions according to the present disclosure. In this exemplary embodiment, the BSe of FIG. 7 is specifically configured as a CBSD/xNB; i.e., (i) to operate using CBRS quasi-licensed spectrum, and (ii) to utilize 3GPP 4G or 5G technology.

As shown, the CBSDe/xNBe 702 includes, inter alia, a processor apparatus or subsystem 845, a program memory module 850, mass storage 848, one or more network interfaces 856, as well as one or more radio frequency (RF) devices 831 having, inter alia, antenna(e) 821 and one or more 4G/5G radio(s).

At a high level, the CBSDe/xNBe maintains a 3GPP-compliant LTE/LTE-A/5G NR "stack" (acting as a EUTRAN eNB or 5G gNB) communications with 3GPP-compliant FWA 704, UEs (mobile devices 139), as well as any other protocols which may be required for use of the designated frequency bands such as e.g., CBRS GAA or PAL band.

As illustrated, the CBSDe/xNBe device 702 includes channel analysis logic 851, and configuration selection and storage logic 859, such as may be rendered in software or firmware operative to execute on the CBSDe processor (CPU) or a dedicated co-processor thereof.

The channel analysis logic 851 and selection/storage logic collectively include a variety of functions including receipt and assembly of CQI or other similar channel quality data relating to the individual CPEe 704 (discussed in greater detail below). The channel analysis logic is in one variant configured to analyze channel stability, such as to enable selection of a proper model for application of CQI-to-MCS mapping (e.g., one that is well adapted for slower changing FWA channel conditions).

As a brief aside, there are different aspects relating to channel quality or capacity as it relates to device mobility. Regarding the UE, the channel between the UE and base station changes when the UE moves from one location to another, or the UE is mobile (in transit). Additionally, the channel itself can vary independent of the UE or base station; for instance, pedestrians, buildings, and other objects physically within the propagation path of the channel create changes in the channel. Further, the base station itself can affect the channel; however since base stations are generally fixed, channel dynamics are not affected.

Additionally, in determining the impact of mobility of the UE, there are several aspects to be considered, including: (i) path loss, (ii) shadowing, and (iii) fading. A mobile UE experiences each of these aspects because of its mobility, and channel conditions can vary frequently and abruptly. However, in the FWA environment, there will generally only be path loss and fading impact, and there will not be abrupt changes in the channel. Notably, in mobility environments, such stability is not present, and abrupt changes may occur on a frequent basis. As such, exemplary embodiments of the present disclosure can leverage this stability in ways that a mobile device cannot, including in some variants extending the CQI measurement intervals and/or building CQI statistics for each CPEe/FWAe, as described in co-owned and co-pending U.S. patent application Ser. No. 17/083,144 filed Oct. 28, 2020 entitled "METHODS AND APPARATUS FOR ENHANCING SCHEDULER FAIRNESS IN SMALL-CELL WIRELESS SYSTEMS," and issuing as U.S. Pat. No. 11,483,203 on Oct. 25, 2022, which is incorporated herein by reference in its entirety.

Hence, in one variant of the channel analysis logic, the CQI values can be used as a typically reliable assessment of channel quality between the fixed base station (BSe) and the fixed FWAe, as well as the stability of the channel.

Additionally, the selection logic is in one variant configured to evaluate CQI data values for purposes of selection of other parameters such as the temporal period (T) discussed below, number of MCS "steps" to use in certain conditions or CQI data patterns, etc. Moreover, the logic 859, 851 is also configured to evaluate feedback data obtained from individual CPEe as part of the MCS iteration operations (discussed below) which enable the CBSDe 702 to converge on an optimal transmitter configuration, such as to maximize data rate.

Additionally, the logic 851, 859 further includes processing to support (i) association of particular CQI and feedback data with individual CPEe (each of which may vary from CPEe to CPEe due to e.g., differences in location, physical interferers, noise, etc.), and (ii) storage of CPEe-specific MCS or other transmitter configuration data within the designated CBSDe storage so as to permit "customized" configurations for each different FWAe.

Moreover, in one implementation, the MCS or other configuration data for each individual CPEe can be broken down on an operating mode or configuration basis; e.g., values to be used for when certain MIMO or spatial multiplexing modes are utilized between that CPEe and the CBSDe.

Also, the logic 851, 859 may be configured selectively adjust the Transport Block Size (TBS), such as according to the selected MCS value.

In yet another variant, the logic 851, 859 of the CBSDe may be configured to receive "raw" or constituent ingredient data for the CQI determination for a given CPEe from that CPEe, and conduct the CQI determination based thereon (rather than having the CPEe itself calculate CQI). For instance, the CPEe logic 906 (discussed below) may be configured to return RSRP or similar power measurements, and any other "CPEe-specific" data that may be required, back to the CBSDe such as via an upstream control channel IE (information element), wherein the CBSDe then determines CQI. This determined CQI value may also be transmitted to the relevant CPEe if needed/desired, such as via a downlink control channel.

Yet other variants of the CBSDe logic 851, 859 may be configured to selectively alter other parameters that can be used to optimize channel throughput, such as selective invocation of spatial multiplexing or spatial diversity, where the CPEe and the physical channels can support it.

Further, the channel analysis logic 851 is configured in some embodiments to generate/utilize path loss models for channel conditions between a given CPEe and the CBSDe. These models may be used for example to project initial channel conditions and select MCS, TBS, and/or other parameters such as initial transmitter power.

In the exemplary embodiment, the processor 845 may include one or more of a digital signal processor, microprocessor, field-programmable gate array, GPU or plurality of processing components mounted on one or more substrates. The processor 805 may also comprise an internal cache memory, and is in communication with a memory subsystem 850, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor. Other embodiments may implement such functionality within dedicated hardware, logic, and/or specialized co-processors (not shown).

The RF antenna(s) 821 are configured to detect and transceive signals from radio access technologies (RATs) in the service area or venue with which the CBSDe/xNBe 702 is associated. For example, LTE (including, e.g., LTE, LTE-A, LTE-U, LTE-LAA) signals may be used as the basis of communication between the CBSD/xNBe and the various mobile devices (e.g., UEs 139) or FWA 704. The antenna(s) 821 may include multiple spatially diverse individual elements in e.g., a MIMO- or MISO-type configuration, such that spatial diversity of the transceived signals can be utilized for e.g., increase in coverage area. Spatial multiplexing (SM) may also be utilized by the xNBe 702 to enhance data throughput; i.e., by multiplexing data streams on different antennae.

In the exemplary embodiment, the radio interface(s) 831 comprise one or more LTE/5G-based radios compliant with 3GPP. Additional unlicensed, licensed, or quasi-licensed air interfaces may also be used within the XNBe 702, including e.g., non-CBRS band LTE or 5G NR, or others. Moreover, the LTE radio functionality may be extended to incipient 3GPP-based 5G NR protocols; e.g., at maturation of LTE deployment and when 5G NR-enabled handsets or FWA are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

The RF radios 831 in one embodiment comprises a digitally controlled RF tuner capable of reception of signals via the RF front end (receive chain) of the RF radio(s) in the aforementioned bands, including in one variant simultaneous reception (e.g., both CBRS 3.550 to 3.700 GHz and 2.300 to 2.500 GHz, bands, CBRS and 600 to 800 MHz bands, or Band 71 and Band 12/17 in another configuration). In another variant, mmWave frequencies (e.g., 42-100 GHz) may be used by the air interface(s), especially in applications where direct LOS transmission is possible. In cases where the CBSDe 702 includes multiple such interfaces, they may also be "traded off" or used selectively with certain constituent CPEe, such as where a mmWave band interface is used to service some CPEe, and an LTE or similar interface is used for other CPEe, such as based on their reported bandwidth requirements, presence of LOS or physical obstructions between the CBSDe and the CPEe, etc. It will be appreciated that due to its very high theoretical data rate, mmWave-enabled applications may benefit less from the techniques described herein than say a comparable 4G or 4.5G (LTE-A) CPEe (unless very heavily loaded), and as such the CBSDe may selectively implement the methodologies described herein only for the latter in one variant.

Figure 8A:
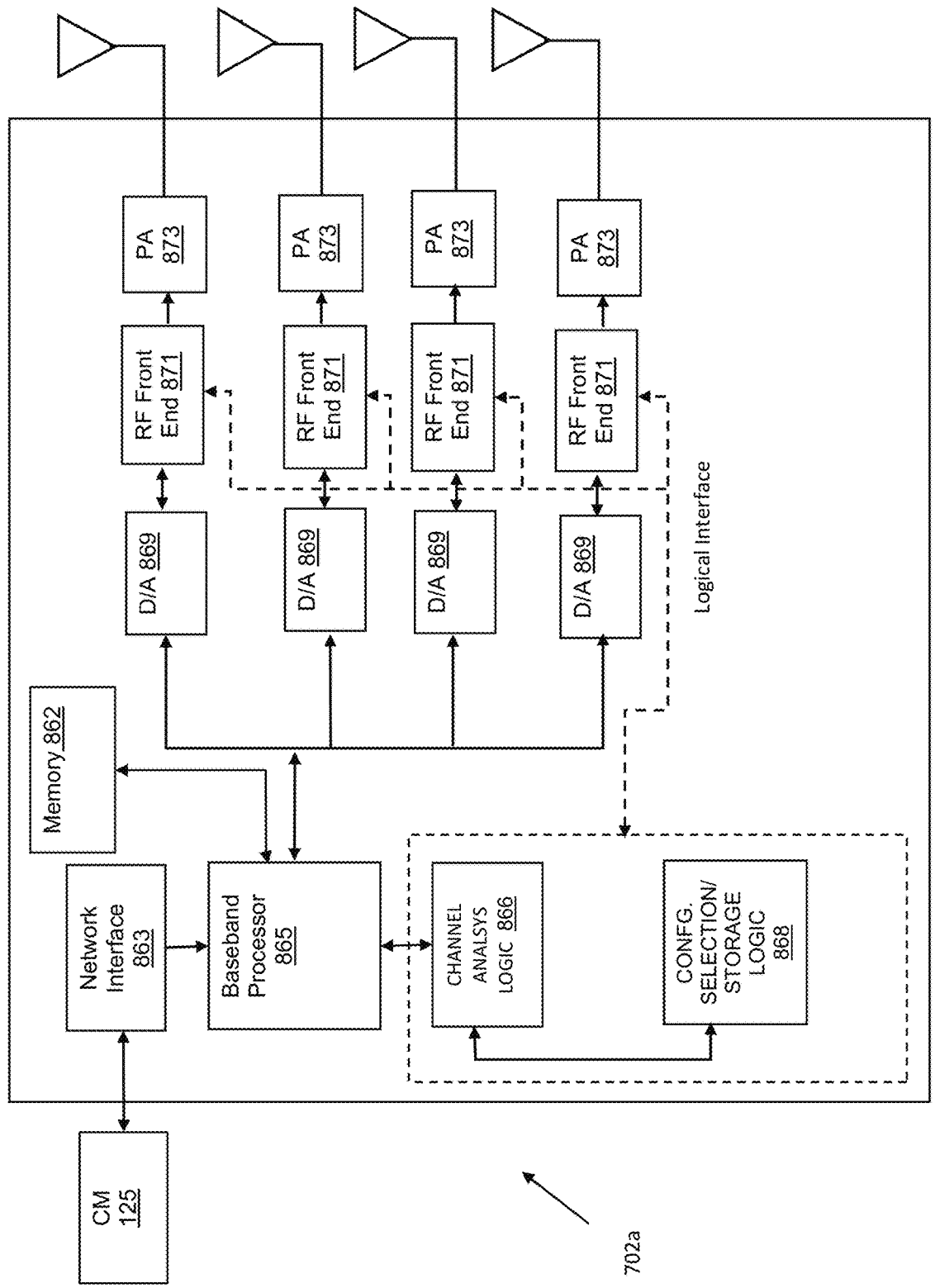
FIG. 8A is a block diagram illustrating another exemplary embodiment of a CBSDe/xNBe base station apparatus according to the present disclosure.

FIG. 8A is a block diagram illustrating one exemplary implementation of the enhanced base station (e.g., xNBe) of FIG. 8, illustrating different antenna and transmit/receive chains thereof.

As illustrated, the device 702a includes baseband processor 865, one or more D/A 869, one or more RF front ends 871, one or more power amplifiers 873, channel analysis logic 866, and configuration selection and storage logic 868, with comparable functionality to that described previously with respect to FIG. 8. Additionally, the exemplary embodiment includes a network interface 863 that interfaces the xNBe to connect to a data network via e.g., a CM 125, such as for wireline backhaul of the CBSDe to an MSO core or headend.

The components of xNBe 702a shown in FIG. 8A may be individually or partially implemented in software, firmware or hardware. The RF front end 871 includes RF circuits to operate in e.g., licensed, quasi-licensed or unlicensed spectrum (e.g., Band 71, Bands 12-17, NR-U, C-Band, CBRS bands, mmWave, etc.). The digital baseband signals generated by the baseband processor 705 are converted from digital to analog by D/As 869. The front-end modules 871 convert the analog baseband signals radio received from D/As 869 to RF signals to be transmitted on the antennas. The baseband processor 865 includes baseband signal processing and radio control functions, including in one variant physical layer and Layer 2 functions such as media access control (MAC). The Power Amplifiers (PA) 773 receives the RF signal from RF front ends, and amplify the power high enough to compensate for path loss in the propagation environment.

It will also be appreciated that the individual transmitter/receiver chains of e.g., the device 702a of FIG. 8A may be controlled differently than others with respect to configuration (e.g., MCS) based on channel conditions. For instance, in 2x spatial multiplexing configuration (e.g., two antenna elements transmitting different data streams), the physical channels between the two different antenna elements and the receiving CPEe antenna element(s) may conceivably be different, and hence one chain might use an MCS (and/or other configuration parameter) different than the other. Similarly, one chain may use different values of parameters such as T (discussed below) and even different feedback data type or periodicity. Similar logic may be applied for spatial diversity configurations which enhance coverage area.

As such, individual transmitter/receiver channels and chains may be "tuned" or optimized by the logic of the CBSDe so as to achieve best data rate given the individual environment of each.

CPEe Apparatus—

FIG. 9 illustrates one exemplary embodiment of an enhanced CPE 704 (here, configured as a CBRS FWAe; e.g., roof-mounted or façade-mounted FWA with associated radio head and CPEe electronics) configured according to the present disclosure.

It will also be appreciated that while described in the context of a CBRS-compliant FWA, the device of FIG. 9 may be readily adapted to other spectra and/or technologies such as e.g., mmWave, Multefire, DSA, LSA, or TVWS.

In one exemplary embodiment as shown, the CPEe/FWAe 704 includes, inter alia, a processor apparatus or subsystem such as a CPU 902, flash memory or other mass storage 904, a program memory module 910 with CQI computation logic 906, 4G baseband processor module 916 with 4G/4.5G stack 918, 5G baseband processor module 912 with 5G NR stack 914 (here also implemented as software or firmware operative to execute on the processor), one or more backend interfaces 908 (e.g., USB, GbE, etc.), power module 932 (which may include the aforementioned PoE injector device), a WLAN/BLE module 934 with integrated WLAN router and antennae 936, and 5G wireless radio interface 920 and 4G/4.5G radio interface 926 for communications with the relevant RANs (e.g., 5G-NR RAN and 4G/4.5G RAN) respectively, and ultimately the EPC or NG Core 710 as applicable.

The RF interfaces 920, 926 are configured to comply with the relevant PHY standards which each supports, and include an RF front end 922, 928 and antenna(s) elements 924, 930 tuned to the desired frequencies of operation (e.g., adapted for operation in 3.55-3.70 GHz band, 5 GHz for the LTE/LTE-A bands, C-Band, NR-U bands, mmWave bands, etc.). Each of the UE radios may include multiple spatially diverse individual elements in e.g., a MIMO- or MISO-type configuration, such that spatial diversity of the received signals can be utilized. Beamforming and "massive MIMO" may also be utilized within the logic of the CPEe/FWAe device.

In one embodiment, the various processor apparatus 902, 912, 916 may include one or more of a digital signal processor, microprocessor, field-programmable gate array, GPU, or plurality of processing components mounted on one or more substrates. For instance, an exemplary Qualcomm Snapdragon x50 5G modem may be used consistent with the disclosure as the basis for the 5G BB processor 912.

The various BB processor apparatus may also comprise an internal cache memory, and a modem.

The program memory module 910 may implement one or more of direct memory access (DMA) type hardware, so as to facilitate data accesses as is well known in the art. The memory module of the exemplary embodiment contains one or more computer-executable instructions that are executable by the CPU processor apparatus 902.

In this and various embodiments, the processor subsystem/CPU 902 is configured to execute at least one computer program stored in program memory 910 (e.g., a non-transitory computer readable storage medium). A plurality of computer programs/firmware are used and are configured to perform various functions such as communication with relevant functional modules within the CPEe/FWAe 704 such as the radio head and WLAN/BLE module 934.

Other embodiments may implement the CQI logic 906 functionality within dedicated hardware, logic, and/or specialized co-processors (not shown). In another embodiment, the module logic 806 is integrated with the CPU processor 902 (e.g., via on-device local memory, or via execution on the processor of externally stored code or firmware).

In some embodiments, the CPEe 704 also utilizes memory or other storage configured to hold a number of data relating to e.g., the various network/gNBe configurations for CQI generation and/or various modes. For instance, the CPEe/FWAe 704 may recall data relating to SINR to CQI mapping used with a given gNBe 702 or RAN from storage. This functionality can be useful for example when the FWAe is disposed at a location potentially served by several different CBSDe 702; in the case where a given CBSDe or wireless channel associated therewith becomes unavailable or non-optimized for whatever reason, the CPEe can selectively transfer to another serving (candidate) CBSDe, including recall of prior channel quality data obtained therefrom as at least a starting point for further optimization of the then-current wireless channel. Likewise, in the case where an antenna element or elements is/are moved for whatever reason (e.g., the premises installation is changed), prior data for the same or different CBSDe can be used by the CPEe during post-change optimization.

In some variants, the CPEe logic 906 may also be configured to utilize actual packet throughput data (e.g., an application such as "iPerf" for determining actual data throughput versus lower-layer processes such as based on BER/PER, etc.). In effect, the CPEe can utilize operating processes such as applications obtaining streaming data on the DL to assess or "second check" the optimization by the CBSDe. For instance, the CBSDe may select a given MCS level and/or TBS for a given CPEe based on the processes described herein (i.e., CQI determination, and subsequent feedback to the CBSDe from the CPEe). However, for various reasons, that "optimized" MCS and/or TBS value selection may conceivably not produce the best data throughput for the target application, and hence the iPerf data may be also fed back to the CBSDe logic 859 so that the CBSDe may understand the UP (user plane) data implications of the lower-layer changes it is making.

Methodology—

Figure 10:
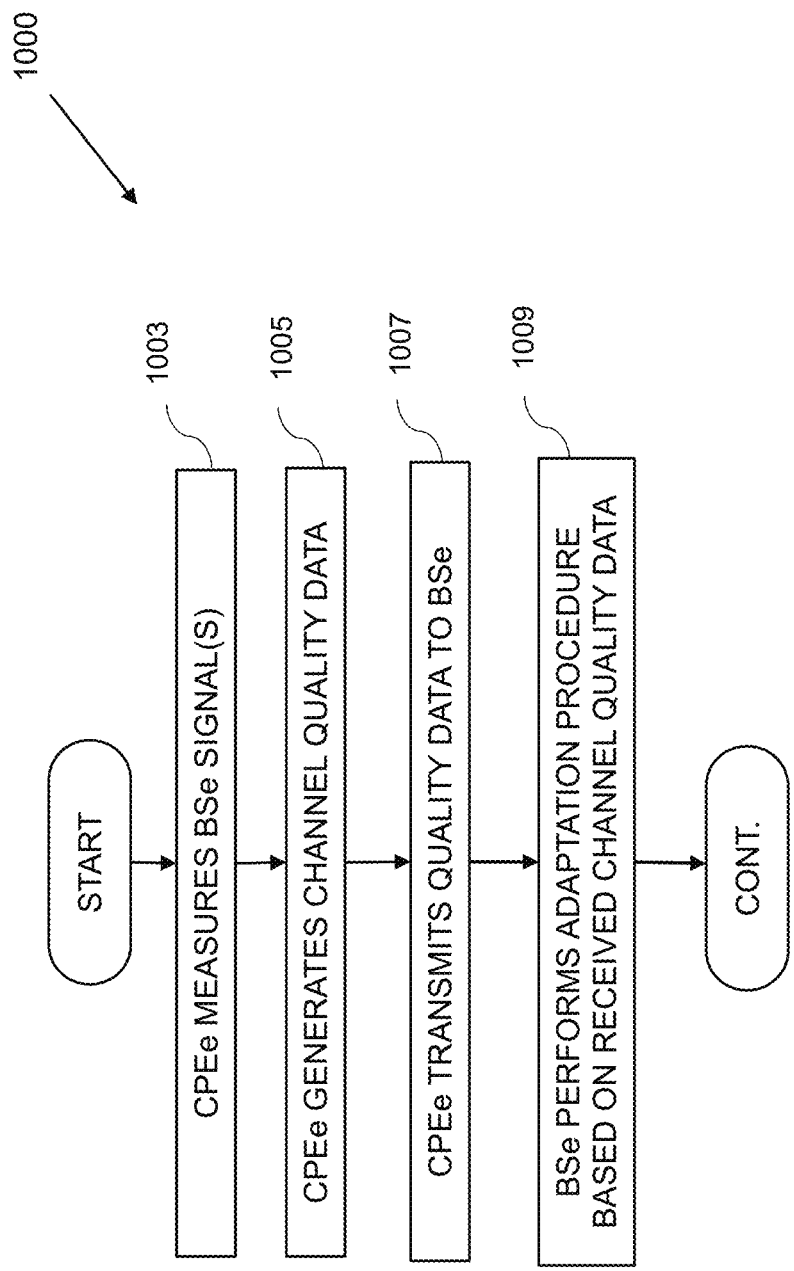
FIG. 10 is a logical flow diagram of an exemplary embodiment of a generalized method of wireless channel assessment and configuration for one or more client devices via an enhanced CPE/FWA, according to the present disclosure.
Figure 11:
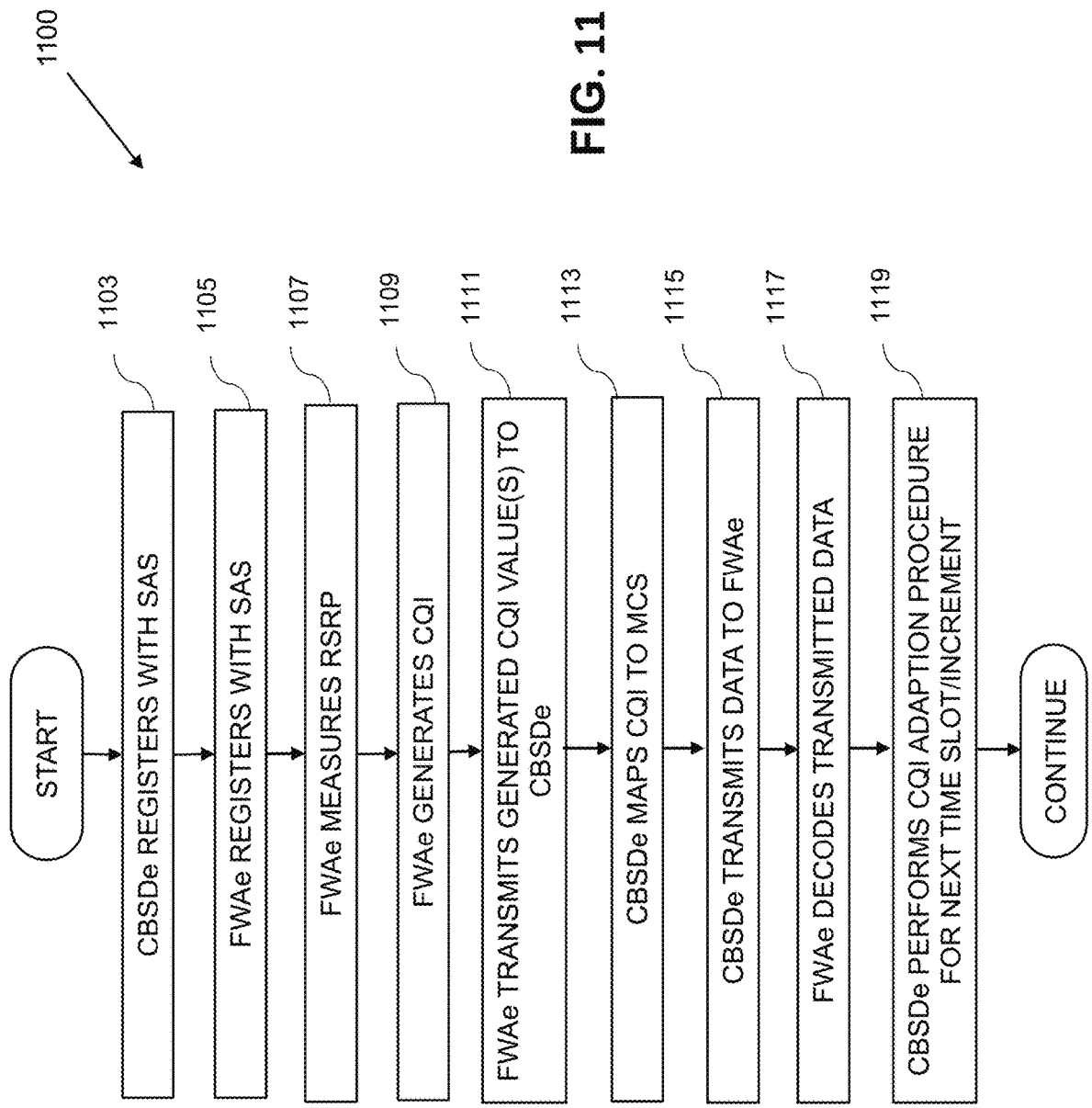
FIG. 11 is a logical flow diagram representing one implementation of the generalized method of FIG. 10.
Figure 12:
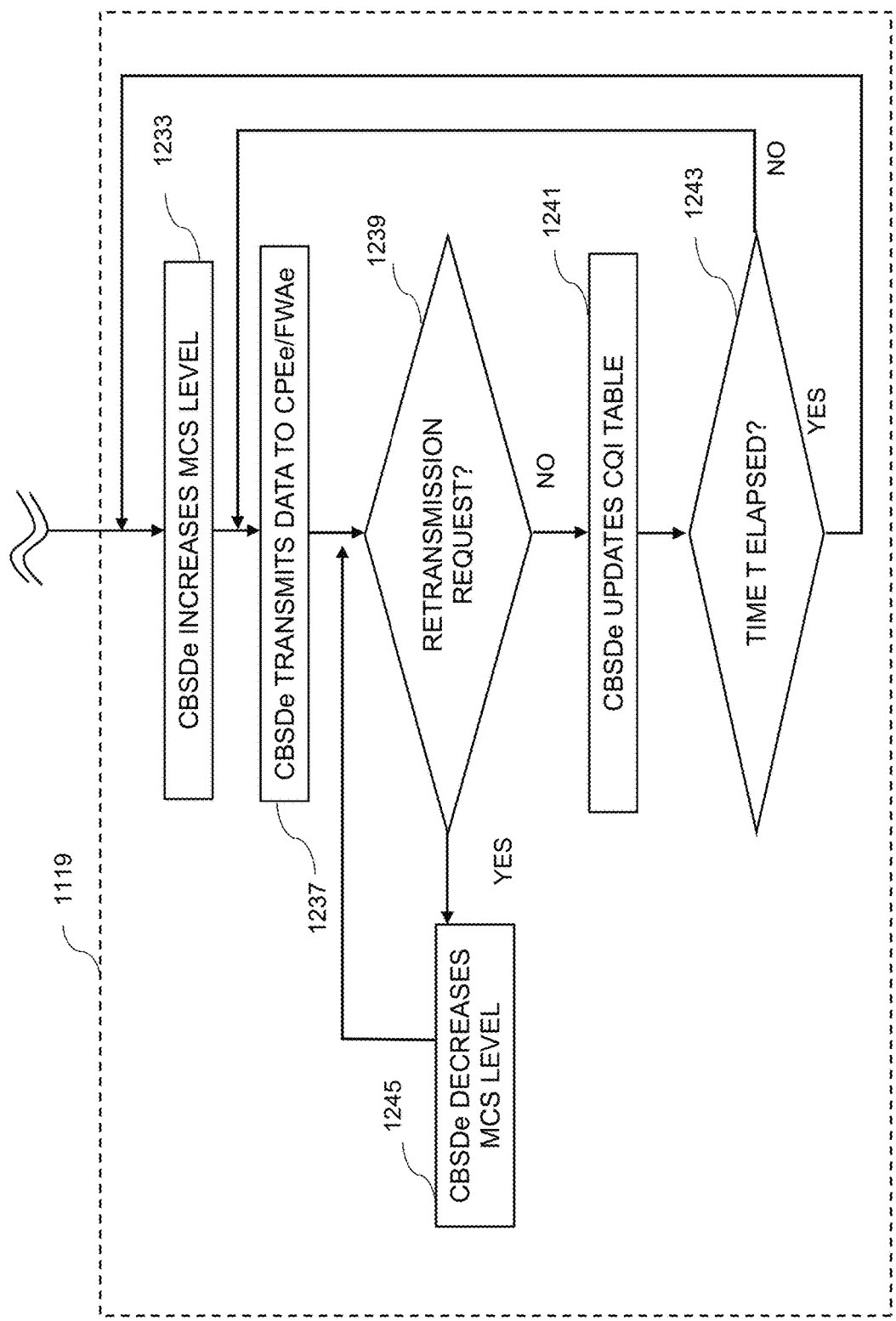
FIG. 12 is a logical flow diagram representing one implementation of the channel configuration adaptation process of the method of FIG. 11.

Various methods and embodiments thereof for enhancing throughput utilizing adaptive channel quality (e.g., CQI) techniques via quasi-licensed (e.g., CBRS GAA or PAL) or other spectrum according to the present disclosure are now described with respect to FIGS. 10-12.

FIG. 10 shows one exemplary embodiment of the generalized method 1000 for adaptive channel quality-based processing according to the present disclosure.

Per step 1003 of the method 1000, the CPEe 704 first assesses transmissions from a given BSe 702, such as by e.g., measurement of the received BSe power using RSRP (Reference Signal Received Power) measurement or other similar techniques.

Per step 1005, the CPEe calculates a signal-to-noise value (e.g., SINR) from the power measurements of step 1003, and maps the calculated value to a quality value or index such as by using a prescribed equation or a pre-defined look-up table (see discussion of exemplary implementations below).

Per step 1007, the CPEe transmits the determined quality value to the BSe. For instance, the CPEe may transmit the current quality value periodically (e.g., every slot, frame, time period, etc.).

Lastly, per step 1009, once the BSe 702 receives the quality value(s), it maps the value(s) to the relevant parametric configuration (e.g., MCS value), and transmits subsequent downlink data using this selected configuration to the CPEe 704. The channel quality value(s) is/are mapped to the configuration through a data structure such as e.g., a lookup table stored in the BSe mass storage 848 or program memory 850.

In some embodiments, the BSe may adaptively update the quality-to-configuration data structure values according to the retransmission feedback it receives from the CPEe, as described in greater detail subsequently herein. Hence, some embodiments of the present disclosure contemplate what amounts to a constant, periodic (or event driven) feedback loop between the CPEe and BSe such that the BSe logic is continually attempting to optimize/maximize downlink data rate and performance. This type of behavior is possible largely by virtue of the fixed nature of the CPEe 704; i.e., since there is no mobility, and channel conditions will generally change much more infrequently (and often more gradually) if at all. With such little/slow variation, the logic is in effect not constantly "chasing its tail" as would be the case in a mobility scenario; configuration changes such as using higher MCS do not introduce undesired multi-variable changes and instability in the system.

FIG. 11 shows one implementation of the method 1000 of FIG. 10, described in the context of the CBRS-based architectures previously discussed (e.g., CBRS spectrum, CBSDe, and FWAe utilizing 3GPP 4G or 5G technology).

Figure 3:
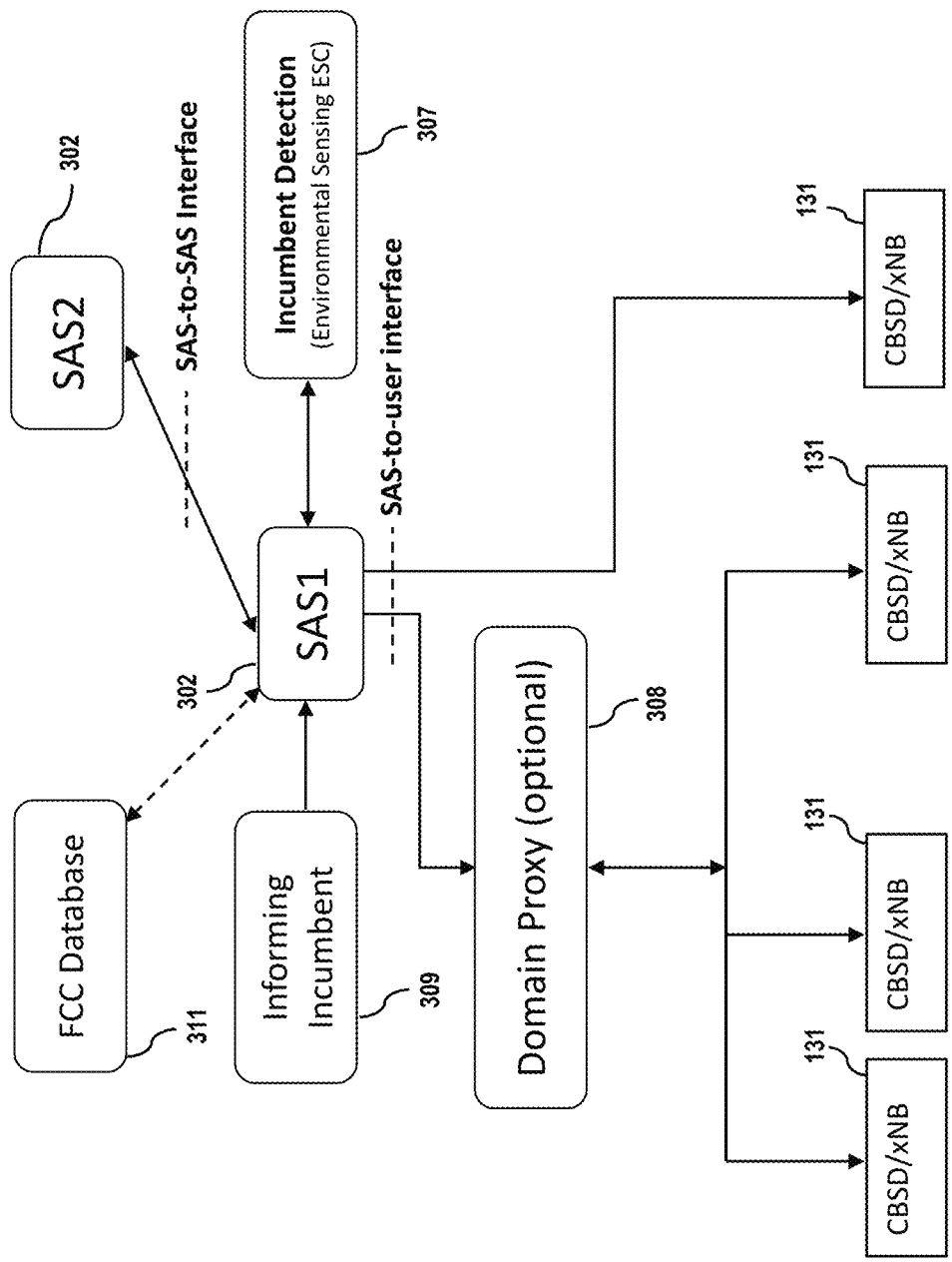
FIG. 3 is a functional block diagram illustrating a general architecture for the CBRS system of the prior art.
Figure 4:
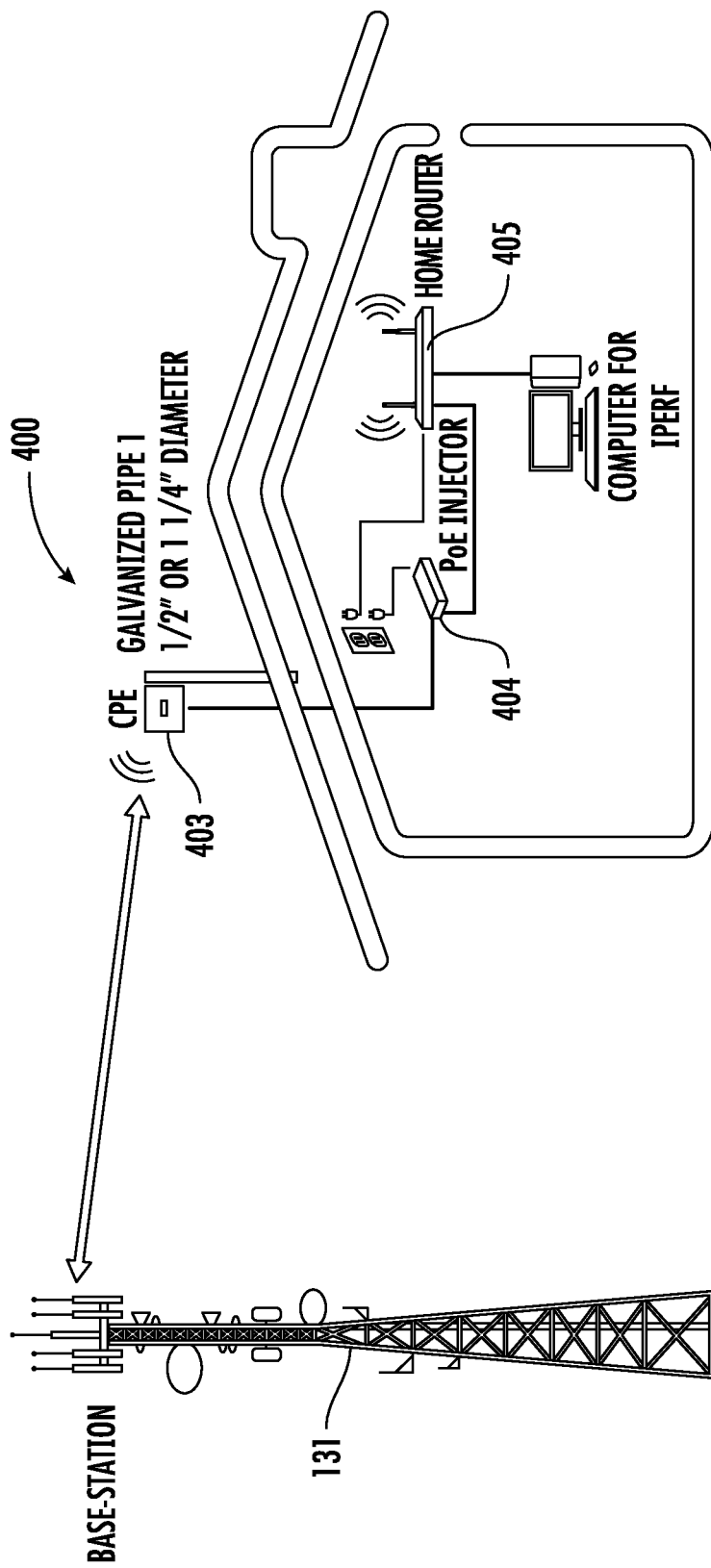
FIG. 4 is a graphical illustration of a prior art configuration for delivery of data from a base station to an end-user device (CPE/FWA) within the wireless coverage area of the base station.

Per step 1103, the CBSDe 702 registers with the SAS 302 (FIG. 3), and the SAS assigns the CBSDe necessary data such as an ID and spectrum grant, according to extant CBRS protocols.

Per step 1105, the CPEe 704 also registers with the SAS. In some scenarios where the CPEe needs to operate at signal levels higher than 23 dBm (e.g., Category A versus B), the CPEe can register with the SAS as a CBSD.

Per step 1107, the CPEe measures the RSRP of the relevant serving CBSDe 702 to estimate the received power associated with the CBSDe. It will be appreciated that this operation (as well as some subsequent steps of the method) may be performed by the CPEe pursuant to evaluating a given CBSDe for subsequent selection and operation. For instance, a given CPEe may have two or three "candidate" CBSDe devices within range, and depending on channel conditions specific to each, the CPEe logic may be configured to evaluate and determine the CBSDe with the highest RSRP value, and only pursue further negotiation and data transfer with that highest CBSDe.

Per step 1109, the CPEe/FWAe 704 calculates the SINR from the estimated CBSDe power, and maps the calculated SINR to a CQI a value through a pre-defined data structure such as a lookup table or an equation. The CQI value indicates the configuration (e.g., MCS) value at which the CPEe can decode the transport data block without any error (or with a prescribed maximum level of tolerable error), which depends on the DL physical channel and its capacity.

In some embodiments of the method, an effective SINRe is computed through a Mutual Information Effective SINR mapping (MIESM) from the instantaneous SINRs at the RSRP location. For instance, the SINRe may be calculated from the following equation:

$$SINRe = f^{-1}\left(\sum_{p=1}^{P} \frac{1}{P} f\left(\frac{SINRp}{\beta}\right)\right) \qquad \text{Eqn. (1)}$$

where P indicates the number of subcarriers in an OFDM symbol, and $\beta$ is a calibration factor. The function f(.) is the bit-interleaved coded modulation (BICM) capacity curve in this embodiment.

In some embodiments, Eqn. (1) may be calculated offline, and stored in the storage device of the relevant component (e.g., CPEe). In some scenarios, the CPEe 704 may use multiple antenna techniques such as spatial multiplexing or transmit diversity techniques for processing the received data including measuring the RSRP, channel estimation and data decoding.

The CPEe may use various receiver type or algorithms to estimate the SINR and decode the data. For instance, Minimum Mean Square Error (MMS), Maximum Likelihood (ML), and/or Maximum Posterior Probability (MAP) may be used consistent with the disclosure, although it will be appreciated by those of ordinary skill given this disclosure that other approaches may be used.

In addition, the CQI generation may correspond to (or be specific to) different Multiple-Input-Multiple-Output DL transmission modes. For instance, in some scenarios, CQI may be generated for closed-loop precoding, Spatial Frequency Block Coding (SFBC), open loop precoding, Multi-User MIMO (MU-MIMO), Cyclic Delay Diversity (CDD), etc. As such, depending on the mode, the CQI may be different.

Further, these scenarios consider different Doppler Frequency, and hence can be used for both slow and fast varying channels (including the presumed slower-varying channels of the exemplary stationary FWAe). Accordingly, these scenarios incorporate Doppler frequency in the CBSDe power estimation, and receiver algorithms to decode the data which leads to an accurate CQI generation under a variety of circumstances including those expected for FWAe installations.

Returning to FIG. 11, per step 1111, the CPEe transmits the determined CQI value(s) to the CBSDe via an UL channel. The CPEe may report the CQI values periodically at certain time (e.g., each time slot, frame), according to a schedule, in an event-driven manner, or otherwise. Moreover, as noted above, depending on mode, the CPEe may transmit multiple CQI values associated with different modes, whether simultaneously or at different times.

Per step 1113, once the CBSDe receives the CQI data from the CPEe, it maps the CQI value to a configuration such as an MCS value through a lookup table stored in the CBSDe storage device (or location otherwise accessible to the CBSDe, such as cloud storage). In some embodiment, the CBSDe may use a fixed CQI table, which is stored locally in CBSDe mass storage or memory. In other embodiments, the stored CQI table may varies for different scenarios, which can depend on channel propagation characteristics such as Doppler shift, antenna correlation, thermal noise variance, angle of arrival and etc. Table 1 below illustrates an exemplary mapping table for CQI (index) versus modulation and coding parameters consistent with the present disclosure. As shown in this example, better (higher) CQI index correlates to higher orders of modulation (e.g., from QPSK at the lower end to 64 QAM or higher at the upper end), as well as higher code rates.

TABLE 1

| CQI Index | Modulation | Code rate × 1024 | Efficiency |
| --- | --- | --- | --- |
| 0 | | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 64 QAM | 466 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

Per step 1115, the CBSDe transmits data to the CPEe on the DL data channel(s) using the calculated configuration (e.g., MCS) value. In one variant, the Transport Block (TB) size is also decided based on the MCS value from a lookup table, e.g., as defined in 3GPP TS 36.213.

Per step 1117, once the CPEe receives the transmitted DL data, it starts decoding the data. In one variant, if the CPEe can decode the data successfully, it will send an ACK signal to the CBSDe indicating that the transmitted data were decoded. Otherwise, it will send a NACK signal indicating that at least part of the transmitted data cannot be recovered correctly, and it requests the CBSDe to retransmit the data. In one implementation, the ability to decode successfully makes use of extant 3GPP protocols (e.g., HARQ/CRC), although other mechanisms for assessing whether the decode or transmission was "successful" can be used consistent with the present disclosure.

Per step 1119, the CBSDe performs a CQI adaptation procedure, wherein it updates the CQI values in the CQI-to-MCS lookup according to MCS value that the DL channel can support (based in the feedback provided by the receiving CPEe 704), and store the new value in the local storage device or cloud storage. In this fashion, the CPEe and CBSDe at least periodically iterate in order to determine maximal or optimized DL configuration such as MCS settings.

FIG. 12 shows one specific implementation of the step 1119 of the method 1100 for adaptive CQI procedure according to the present disclosure.

At step 1233, the CBSDe increases the MCS level to the next MCS level for the transmission of data in the next DL data transmission interval (such as for example a TTI or transmission time interval commonly used in some scheduler architectures). In one variant, the CBSDe logic is configured to select a next highest MCS value from a table of known values (i.e., increment one level at a time). In other variants, the change may be multi-level, such as where the CBSDe has data indicating that the current MCS selection if far below channel capacity (e.g., the current MCS level is at or near the bottom of level of the table, and no "negative" feedback has been received from CPEe, or the CPEe is similarly situated in terms of location to another CPEe which utilized much higher MCS setting). Moreover, the progression through the levels may be in some instances non-linear (such as where multiple steps are utilized initially, and then as a "final" level is converged on, the changes become more incremental such as single-stepwise).

Additionally, it will be appreciated that the data structure may be arranged such that the resulting effect of a single step (i.e., a linear progression through the table) produces non-linear results. For instance, the transition from 16 QAM to 64 QAM (ostensibly a single step in one implementation) may produce a disproportionate or different result then the next single-step change (e.g., 64 QAM to 256 QAM) in terms of error rate or channel burden. Stated differently, the DL channel may have non-linear degradation as a function of MCS and/or other configuration parameters that may be used by the CBSDe during optimization. This can also reflect itself as a "hysteresis" of sorts; i.e., that changes in channel capacity due to a change in one or more MCS parameters may be different when increasing MCS parameter(s) than when decreasing them. Moreover, it is recognized by the inventors hereof that the steps of increasing MCS or related parameters may be asymmetric with those of decreasing them. For instance, if the NACK rate detected by the logic increases very rapidly with the increased MCS, the CBSDe can lower MCS two or three steps in a non-linear fashion. Similarly, if MCS levels are increased by two steps, and if there is no NACK, then MCS level can jump by 3 steps at one time. Such logic may be dynamically implemented as well; i.e., the number of steps "jumped" or reduced in one variant is dependent on inputs such as rate of received NACKs, and may also be non-linear for different regions of the "NACK" curve. As a simple example, the change from a QPSK tier to a 16 QAM tier in Table 1 (e.g., from CQI index value 6 to 7) might produce a first rate-of-change for NACKs per unit time, while a change from 16QAM to 64 QAM (e.g., index value 8 to 9 in Table 1) produces a second, different rate-of-change. Using such data, the logic can dynamically calibrate channel parameter change "sensitivity" values, including on a per-metric (e.g., for modulation type, coding level, etc. individually or in ensembles of parameter changes) how many steps should be jumped (up or down) depending on its accumulated data characterization of that particular channel/FWAe. One FWAe might require a jump of say three steps in a QPSK- 16QAM transition, based on prior statistical or anecdotal NACK sensitivity data, while another FWA might only require two step jumps under the same transition.

Moreover, in that the foregoing statistical/anecdotal data is somewhat "living" (e.g., may change over time with changes in e.g., channel path loss or shadowing), the implementation of the logic may accordingly adapt to such changes including in structuring its MCS parameter variation regimes on a per-FWAe basis.

Per step 1237 of the method of FIG. 12, the CBSDe transmits DL data to the CPEe using the new MCS value after selection/update thereof.

Per step 1239, the CBSDe checks its feedback data; e.g., if it receives one or more NACK from the CPEe, indicating that the CPEe decoded at least part of the data block erroneously. In this case, the method proceeds to step 1245, and decreases the MCS value to the previous MCS level and monitors for feedback indicative that the change was effective. In some cases, the system may be configured to "intelligently" drop two or more levels, such as when a high rate of NACKs is obtained indicating serious and rapid channel degradation.

Per step 1241, if the CBSDe receives no negative or positive feedback, such as an ACK signal from the CPEe, it then updates its CQI/MCS mapping table to reflect the result of that MCS change, and stores the new table in the storage device.

Per step 1243, the CBSDe uses the updated CQI value from step 1241 for the duration T. If the Time T has elapsed, the CBSDe in this variant will proceed to step 1233, and increase the MCS level (e.g., to the next step), and repeat the process. Accordingly, the CBSDe keeps a table that is constantly (or at least periodically) updated for the highest or most optimized configuration for that CPEe (and operating mode) based on a given (presumed stable) CQI value returned from the CPEe.

It will be recognized by those of ordinary skill that a number of variations of the foregoing methodologies may be used, depending on the desired level of stability, actual stability of the channel(s) being measured, changes in operating mode, etc. For example, in one variant, a channel which, despite being associated with a fixed receiver such as the FWAe, has more variable or unpredictable changes, may be associated with a shorter value of T (timeout) of step 1243, so as to enable more prompt adjustments. Likewise, a higher instance of CQI determination (e.g., RSRP measurement and reporting back to the CBSDe) may be used in such cases.

Additionally, the logic of the CBSDe 702 can be configured such that if unexpectedly rapid or transient CQI changes are experienced (whether anecdotally or over time) that are inconsistent with a typical FWA installation, data can be sent to e.g., a network process such as a CBSDe or CPEe manager entity of the MSO indicating a potential issue with the given CPEe, such as an interfering structure or RF noise source, CPEe antenna misalignment or movement, (e.g., loose or knocked out of position due to weather), or similar. Possible remedies may include inspection/realignment of the equipment, removal of the interferer, or relocation of the CPEe antennae to a better location on the served premises.

Similarly, the logic may be configured such that when a mode or other operational change is invoked which might cause a change in channel capacity (e.g., from a first MIMO mode to another different mode, CPEe reboot, spectrum withdrawal and re-allocation to a new carrier, etc.), a new power measurement and CQI determination may be performed by the receiver in order to promptly evaluate that new mode/configuration.

Further, as alluded to previously, in cases where two CPEe are known (e.g., based on channel modeling, historical channel estimations, etc.) to have similar characteristics, the CBSDe may in some instances "borrow" CQI or similar data obtained from one station in order to use with another until further CPEe-specific measurements and configuration iterations as described above can be performed.

Additionally, in some embodiments of the foregoing methodologies, the CPEe or BSe may be configured to determine if in fact the channel being assessed is substantially invariate over time (i.e., does not change appreciably over a prescribed period of time which is associated with a defined level of channel stability). For instance, in one variant, the CPEe can determine CQI values (or constituent/predecessor values thereof, such as RSRP) over a test period of time, and either locally evaluate the stability, or return the data to the BSe for determination of stability thereby. If sufficient channel stability exists (generally associated with a fixed CPEe), then the foregoing methodologies may be applied to e.g., update the CQI-MCS mapping tables.

Figure 13:
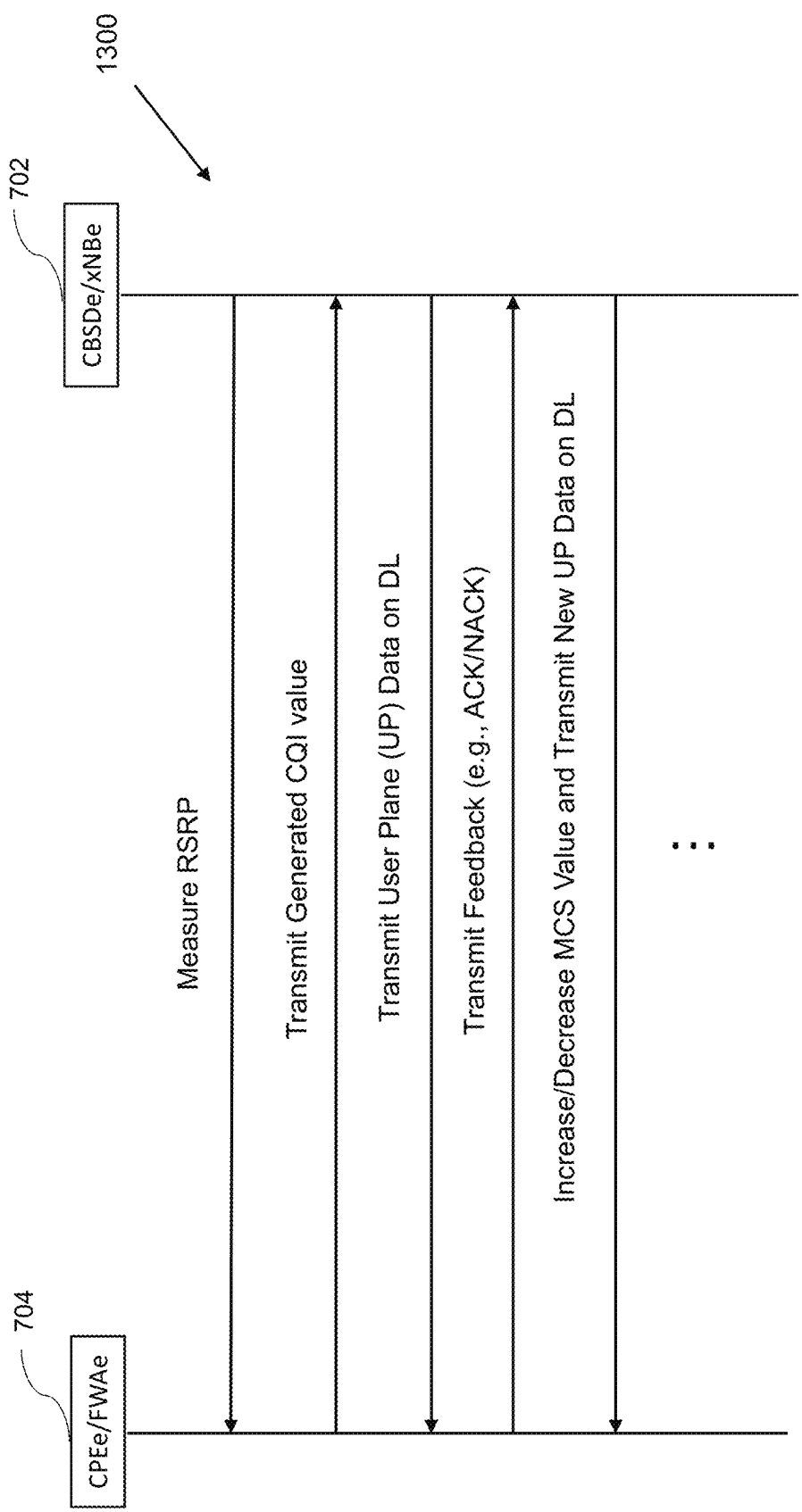
FIG. 13 is a ladder diagram illustrating communication and data flow between a serving CBSDe/xNBe and served FWAe, according to one embodiment of the present disclosure.

FIG. 13 is a ladder diagram illustrating one embodiment of the communication flow between CBSDe 702 and CPEe 704. Note that in the exemplary embodiment, one or more extant 3GPP control plane (CP) channels are used for passing data between the CPEe and CBSDe in the UL, although other mechanisms may be used as well.

Service Provider Network—

Figure 14:
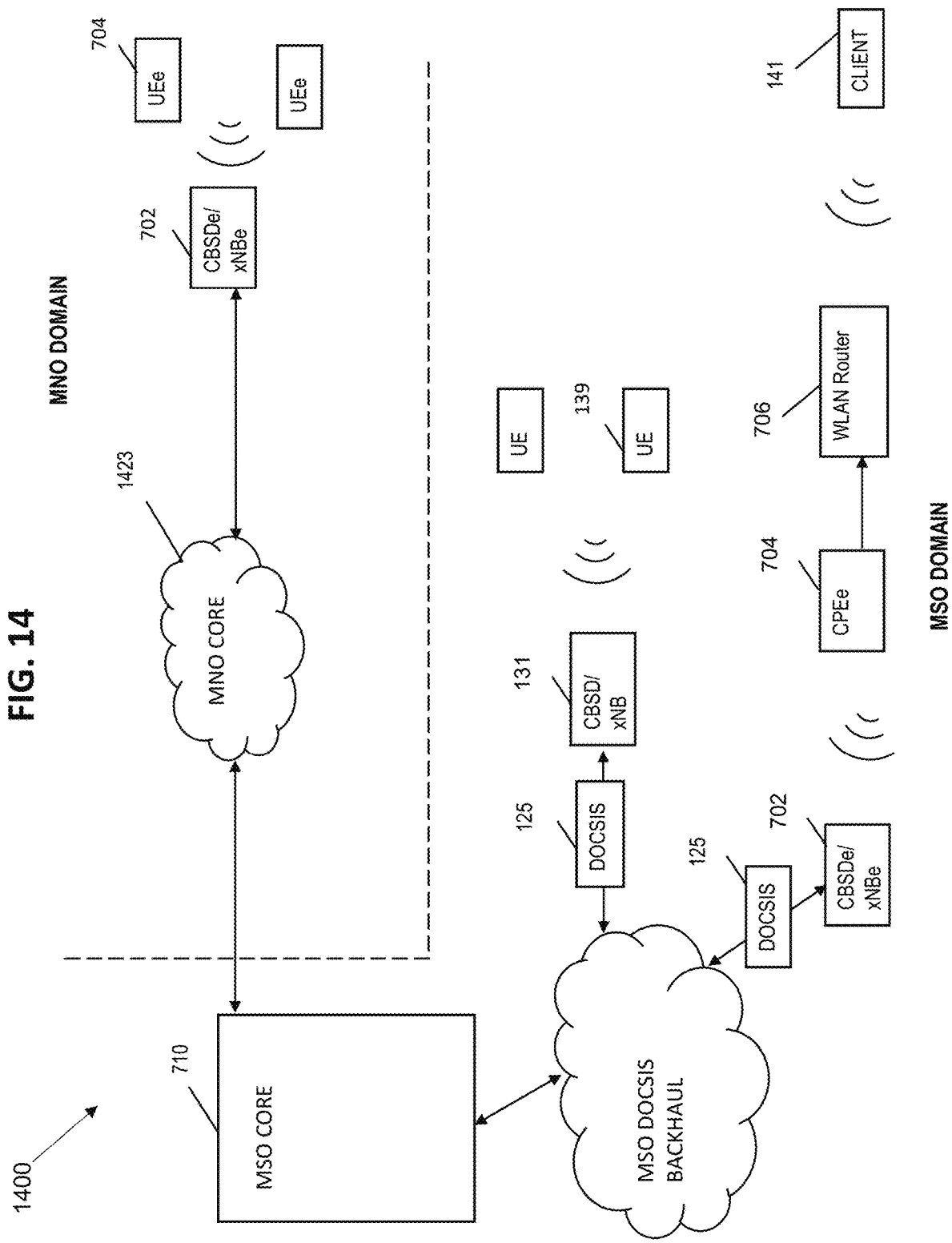
FIG. 14 is a block diagram illustrating one embodiment of an MSO/MNO cooperative network architecture utilizing the enhanced CBSD and CPE/FWA apparatus of the present disclosure.

FIG. 14 illustrates one embodiment of a service provider network configuration useful with the adaptive CQI functionality and supporting 3GPP/CBRS-based wireless network(s) described herein. It will be appreciated that while described with respect to such network configuration, the methods and apparatus described herein may readily be used with other network types and topologies, whether wired or wireless, managed or unmanaged.

The exemplary service provider network 1400 is used in the embodiment of FIG. 14 to provide backhaul and Internet access from the service provider's wireless access nodes (e.g., CBSDe/xNBe devices, Wi-Fi APs, FWAe devices or base stations operated or maintained by the MSO), and one or more stand-alone or embedded DOCSIS cable modems (CMs) 125 in data communication therewith.

The individual CBSDe/xNBe devices 702 are backhauled by the CMs 125 to the MSO core via 710 includes at least some of the EPC/5GC core functions previously described. Each of the CPEe/FWAe 704 are communicative with their respective CBSDe 702. Client devices 141 such as tablets, smartphones, SmartTVs, etc. at each premises are served by respective WLAN routers 706, the latter which are backhauled to the MSO core or backbone via their respective CPEe/FWAe 704.

Notably, in the embodiment of FIG. 14, all of the necessary components for support of the CPEe/FWAe and BSe functionality described above are owned, maintained and/or operated by the common entity (e.g., cable MSO). The approach of FIG. 14 has the advantage of, inter alia, giving the MSO control over the entire service provider chain, including control over the xNBe devices so as to optimize service to its specific customers (versus the non-MSO customer-specific service provided by an MNO, as discussed below), and the ability to construct its architecture to optimize incipient 5G NR functions such as network slicing, gNB DU/CU Option "splits", etc.

Notwithstanding, in the embodiment of FIG. 14, the architecture 1400 may further include an optional MNO portion (e.g., MNO core 1423 and associated CBSDe or xNBe devices 702, and/or non-enhanced CBSD/xNB devices, which may be operated by the MNO versus the MSO in support of e.g., fixed UE comparable to the CPEe/FWAe within the MSO network, including for subscribers of the MSO or otherwise. For example, other functions such as 3GPP EPC/E-UTRAN or 5GC and NG-RAN functionality can be provided by one or more MNO networks operated by MNOs with which the MSO has a service agreement (and between which data connectivity and network "federation" exists, as shown). This approach has the advantage of, inter alia, avoiding more CAPEX by the MSO, including duplication of infrastructure which may already service the area of interest, including reduced RF interference due to addition of extra (and ostensibly unnecessary) CBSDe/xNB e devices or other transceivers.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method of operating a base station within a wireless network, the method comprising:
   obtaining channel quality data related to channel quality from an end-user device;
   mapping the obtained channel quality data to an index relating to a transmission configuration of a radio transmitter of the base station;
   transmitting first data to the end-user device using the radio transmitter configured according to the index; and
   based on non-receipt of feedback data from the end-user device, inferring that additional capacity is required for the end-user device to perform a decoding operation.

2. The method of claim 1, further comprising based on the inferring, selecting a subsequent value of the index for transmission of subsequent second data via the radio transmitter.

3. The method of claim 2, further comprising:
   transmitting the subsequent second data to the end-user device, the subsequent second data configured to cause a reconfiguration of the radio transmitter to operate according to a configuration supporting a higher data rate modulation and coding scheme than the first data.

4. The method of claim 2, wherein the selecting of the subsequent value of the index for the transmission of the subsequent second data via the radio transmitter comprises:
   calculating a new CQI-to-MCS (Channel Quality Index to Modulation and Coding Scheme) correlation relationship; and
   updating a CQI-to-MCS data structure based on the calculated relationship.

5. The method of claim 2, further comprising:
   accessing historical data regarding changes in channel capacity as a function of changes in the index; and
   using the accessed historical data to select a new index for the transmission of the subsequent second data.

6. The method of claim 5, wherein the selection of the new index is further configured to achieve a target rate of change.

7. The method of claim 5, wherein the accessing of the historical data regarding the changes in the channel capacity as the function of changes in the index comprises accessing statistical data which is at least in part specific to the end-user device.

8. The method of claim 1, wherein:
   the base station comprises a CBRS (Citizens Broadband Radio Service) CBSD (Citizens Broadband Service Device) compliant with 3GPP (Third Generation Partnership Project) protocols;
   the transmitting the first data comprises transmitting using a CBRS frequency within a band of 3.550 to 3.700 GHz inclusive, the CBRS frequency assigned to the CBRS CBSD by a SAS (Spectrum Allocation System); and
   the end-user device comprises a CBRS fixed wireless apparatus (FWA).

9. A fixed wireless apparatus for use in a wireless network, comprising:
   at least one wireless interface;
   processor apparatus in data communication with the at least one wireless interface; and
   storage apparatus in data communication with the processor apparatus, the storage apparatus comprising at least one computer program configured to, when executed by the processor apparatus, cause the fixed wireless apparatus to:
   utilize the at least one wireless interface to measure at least one aspect of a radio frequency (RF) signal transmitted from a base station serving the fixed wireless apparatus;
   based at least on the measured at least one aspect, determine at least one data value indicative of a quality of a channel carrying the transmitted RF signal;
   transmit the at least one data value to the base station using the at least one wireless interface; and
   thereafter:
      perform decoding operations on user plane (UP) data transmitted to the fixed wireless apparatus using the channel based at least on parameters obtained by the base station using the at least one data value; and
      based at least on the decoding operations, transmit feedback data to the base station using the at least one wireless interface, the feedback data comprising one of an acknowledgment (ACK) signal or a negative-acknowledgment (NACK) signal.

10. The fixed wireless apparatus of claim 9, wherein:
the base station comprises a CBRS (Citizens Broadband Radio Service) CBSD (Citizens Broadband Service Device) compliant with 3GPP (Third Generation Partnership Project) protocols;
the UP data is received using a CBRS frequency within a band of 3.550 to 3.700 GHz inclusive, the CBRS frequency assigned to the CBRS CBSD by a SAS (Spectrum Allocation System);
the fixed wireless apparatus comprises a CBRS fixed wireless apparatus (FWA) disposed at a user premises; and
the base station and the fixed wireless apparatus are each managed by a common network operator serving the user premises.

11. The fixed wireless apparatus of claim 9, wherein:
the measured at least one aspect of a radio frequency (RF) signal comprises a received power measurement; and
the determination of the at least one data value indicative of the quality of the channel carrying the transmitted RF signal comprises:
determination of a quantity relating signal to noise within the RF signal; and
using the determined quantity to generate at least one channel quality index value.

12. The fixed wireless apparatus of claim 9, wherein the at least one computer program is further configured to, when executed by the processor apparatus, determine that the channel carrying the transmitted RF signal is substantially invariate over a prescribed period of time.

13. The fixed wireless apparatus of claim 9, wherein the ACK signal comprises data indicating that the parameters obtained by the base station need to be modified to increase a MCS (Channel Quality Index to Modulation and Coding Scheme) value, and the NACK signal comprises data indicating that the parameters obtained by the base station need to be modified to decrease the MCS value.

14. Computer readable apparatus comprising a non-transitory storage medium, the non-transitory storage medium comprising at least one computer program, the at least one computer program comprising a plurality of instructions which are configured to, when executed on a processing device, cause iterative update of at least one aspect of a configuration of a radio frequency transmitter to optimize a data rate during transmission of data by at least:
receipt of channel quality data associated with a wireless physical channel;
association of the received channel quality data with a fixed wireless apparatus that transmitted the channel quality data;
correlation of the channel quality data to an index indicating the at least one aspect of the configuration of the radio frequency transmitter for use during said transmission of the data;
configuration of the radio frequency transmitter based at least on the index;
causation of the transmission of the data from the radio frequency transmitter to the particular fixed wireless apparatus after said configuration over the wireless physical channel;
receipt of performance data indicative of a capacity of the wireless physical channel; and
iterative modification of the at least one aspect of the configuration of the radio frequency transmitter for use during respective subsequent transmission of data in order to converge on an optimized data rate;
wherein the iterative modification of the at least one aspect of the configuration of the radio frequency transmitter comprises dynamic determination of one of (i) a step or (ii) an increment value to be utilized during at least part of the iterative modification.

15. The computer readable apparatus of claim 14, wherein:
the receipt of the channel quality data associated with the wireless physical channel comprises receipt of a plurality of CQI (channel quality index) data corresponding to respective ones of different times; and
and the at least one computer program is further configured to, when executed on the processing device, determine that a channel to be used for carrying the transmitted data is sufficiently invariate.

16. The computer readable apparatus of claim 14, wherein:
the processing device comprises a processing device of a wireless base station; and
the association of the received channel quality data with the fixed wireless apparatus that transmitted the channel quality data comprises utilizing identifier data unique to the fixed wireless apparatus in order to uniquely identify the particular fixed wireless apparatus and channel quality data associated therewith within a data structure maintained by the wireless base station, the data structure also comprising channel quality data uniquely associated with other fixed wireless apparatus.

17. The computer readable apparatus of claim 14, wherein the receipt of the performance data indicative of the capacity of the wireless physical channel comprises receipt of a plurality of data over a prescribed period of time, individual ones of the plurality of data associated with individual transmissions of data to the fixed wireless apparatus occurring at different times.

18. The computer readable apparatus of claim 17, wherein the receipt of the plurality of data over the prescribed period of time comprises receipt of data indicative of whether the capacity was exceeded.

19. The computer readable apparatus of claim 14, wherein the dynamic determination of the one of (i) the step or (ii) the increment value to be utilized during at least part of the iterative modification comprises accessing historical data specific to the fixed wireless apparatus, the historical data relating at least in part to sensitivity of the performance data to changes in the at least one aspect.

20. The computer readable apparatus of claim 14, wherein the dynamic determination of the one of (i) the step or (ii) increment value to be utilized during at least part of the iterative modification comprises a single step transition from a first QAM (quadrature amplitude modulation) value to a second QAM, the single step transition producing a disproportionate result than a next single-step transition in terms of at least one of error rate or channel burden.

* * * * *